US009823593B2

(12) United States Patent
Yamato et al.

(10) Patent No.: US 9,823,593 B2
(45) Date of Patent: Nov. 21, 2017

(54) POLYESTER RESIN FOR TONER, METHOD FOR PRODUCING SAME AND TONER

(71) Applicant: Mitsubishi Rayon Co., Ltd., Tokyo (JP)

(72) Inventors: Shinya Yamato, Toyohashi (JP); Tetsuya Ochiai, Toyohashi (JP); Hideyuki Fujii, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 249 days.

(21) Appl. No.: 14/295,933

(22) Filed: Jun. 4, 2014

(65) Prior Publication Data

US 2014/0288262 A1 Sep. 25, 2014

Related U.S. Application Data

(62) Division of application No. 12/067,414, filed as application No. PCT/JP2006/318598 on Sep. 20, 2006, now abandoned.

(30) Foreign Application Priority Data

Sep. 20, 2005 (JP) ................................ 2005-272337
Apr. 28, 2006 (JP) ................................ 2006-126012
Aug. 8, 2006 (JP) ................................ 2006-215745

(51) Int. Cl.
*C08G 63/54* (2006.01)
*C08G 63/52* (2006.01)
*G03G 9/087* (2006.01)

(52) U.S. Cl.
CPC ..... *G03G 9/08755* (2013.01); *G03G 9/08791* (2013.01); *G03G 9/08795* (2013.01)

(58) Field of Classification Search
CPC ............... C08G 63/52; G03G 9/08755; G03G 9/08793; C03G 9/08795
See application file for complete search history.

(56) References Cited

U.S. PATENT DOCUMENTS

| | | | |
|---|---|---|---|
| 5,618,648 A | 4/1997 | Horikoshi et al. | |
| 5,976,752 A | 11/1999 | Matsunaga et al. | |
| 6,232,027 B1 | 5/2001 | Matsunaga et al. | |
| 2004/0067430 A1 | 4/2004 | Terauchi et al. | |
| 2004/0152813 A1 * | 8/2004 | Shirai .................... | C08G 63/52 524/275 |
| 2005/0064310 A1 | 3/2005 | Masuda et al. | |
| 2005/0064313 A1 | 3/2005 | Kishiki et al. | |
| 2006/0115758 A1 | 6/2006 | Chang et al. | |

FOREIGN PATENT DOCUMENTS

| | | |
|---|---|---|
| EP | 0 961 175 A2 | 12/1999 |
| EP | 0 961 175 A3 | 12/1999 |
| EP | 1 505 450 A1 | 2/2005 |
| JP | 3-135578 | 6/1991 |
| JP | 4-350667 | 12/1992 |
| JP | 8-152743 | 6/1996 |
| JP | 9-325520 | 12/1997 |
| JP | 2000-242030 | 9/2000 |
| JP | 2004-151535 | 5/2004 |
| JP | 2005-10456 | 1/2005 |
| JP | 2005-173063 | 6/2005 |
| JP | 2005275235 | * 10/2005 |

* cited by examiner

*Primary Examiner* — Ling Choi
*Assistant Examiner* — Thuy-Ai N Nguyen
(74) *Attorney, Agent, or Firm* — Oblon, McClelland, Maier & Neustadt, L.L.P.

(57) ABSTRACT

Disclosed is a toner which is excellent in low-temperature fixability, high-temperature offset resistance, storage stability and durability, while having a wide range of fixing temperature. Also disclosed is a polyester resin used for such a toner. The polyester resin is one of the following polyester resin (A)-(E) for toners. (A) A polyester resin for toners having an Mp as determined by GPC of not less than 12,000 and having an unsaturated double bond (B) A polyester resin for toners obtained by crosslinking the polyester resin (A) (C) A polyester resin for toners containing the polyester resin (A) and another polyester resin having an Mp as determined by GPC of less than 12,000 (D) A polyester resin for toners obtained by crosslinking the polyester resin (C) (E) A polyester resin for toners containing a THF soluble fraction and a THF insoluble fraction wherein the Mw/Mn of the THF soluble fraction is not less than 6 and the total of the acid value and the hydroxyl value of the THF insoluble fraction is not more than 40 mgKOH/g.

15 Claims, No Drawings

POLYESTER RESIN FOR TONER, METHOD FOR PRODUCING SAME AND TONER

This application is a divisional application of U.S. Ser. No. 12/067,414 filed on Apr. 11, 2008 which is a 371 application of PCT/JP2006/318598 filed on Sep. 20, 2006.

TECHNICAL FIELD

The present invention relates to a polyester resin for toner, to a process for its production and to toner.

BACKGROUND ART

In methods for obtaining images by electrophotographic printing and electrostatic development, electrostatic charge images formed on photosensitive materials are fixed after being developed by toner that has been electrified by friction. Fixing systems include heat roller systems that fix developed toner images using pressurized heated rollers, and non-contact fixing systems whereby fixing is accomplished using electric ovens or flash beam light.

For these processes to be performed smoothly, the toner must firstly be able to hold a stable electrostatic charge, and secondly must satisfactorily fix onto paper. Also, since the apparatus has a heating element in the fusing section that causes the temperature in the apparatus to increase, the toner must be one that does not undergo blocking in the apparatus.

The increasing emphasis on reducing energy consumption in recent years has spurred advances in the area of reducing temperatures in the fusing sections in heat roller systems. This has resulted in greater demand for toner with the ability to affix to paper at low temperature, also known as low temperature fixability. In addition, offset resistance is considered a standard requirement in consideration of the offset phenomenon that occurs in heat roller systems. It is therefore necessary for toner to exhibit low-temperature fixability whereby it becomes fixed to paper under conditions with a fixing temperature of 140° C., for example, while maintaining offset resistance, while toner is also desired which has a wider working range, such as a fixing temperature range of 50° C. or above.

Toner binding resins have a major effect on the aforementioned toner properties and include polystyrene resins, styrene-acrylic resins, polyester resins, epoxy resins, polyamide resins and the like, among which polyester resins have attracted particular interest recently in light of more easily obtaining balance between transparency and fixability.

It has been attempted in the past to broaden the fixing temperature range of polyester resins by using non-linear polyester resins having three-dimensional crosslinked structures comprising trifunctional or greater monomers (for example, see Patent document 1). However, while the non-linear polyester resins disclosed in Patent document 1 have excellent high-temperature offset resistance and exhibit a high maximum fixing temperature, the level of low-temperature fixability has not been satisfactory.

Means for improving the low-temperature fixability have been investigated using linear polyester resins composed of divalent carboxylic acid compounds and divalent alcohol compounds (for example, see Patent document 2). However, linear polyester resins without a three-dimensional structure exhibit poor high-temperature offset resistance despite their excellent low-temperature fixability, and as a result the fixing temperature range is not very broad.

It has also been attempted to introduce unsaturated groups into linear polyester resins for reaction and crosslinking with polymerization initiators (for example, see Patent documents 3-6).

Patent document 3, for example, describes a technique involving crosslinking reaction of an unsaturated polyester resin composed of a divalent carboxylic acid such as isophthalic acid or maleic anhydride and a divalent alcohol such as bisphenol A propylene oxide addition product, using dicumyl peroxide as the polymerization initiator. Toner employing crosslinked polyester resins obtained in such a manner are characterized by favorable fixability and absence of the "marking back" phenomenon, but the large amount of organic peroxide used, about 0.5-20 mass % with respect to the resin, results in significant residue of decomposition products in the resin and a lower storage stability.

Patent document 4 describes crosslinking reaction of an unsaturated polyester resin composed of fumaric acid with bisphenol A propylene oxide addition product or the like to obtain a toner resin that includes a crosslinked fraction and non-crosslinked fraction. The toner described in Patent document 4, however, has a major drawback of low durability.

Patent document 5 describes a toner resin obtained by heating an unsaturated polyester resin having a number-average molecular weight of 1,000-4,000 and an unsaturated double bond, or further curing it in the presence of a polymerization initiator. The toner described in Patent document 5, however, has an unsatisfactory fixing range.

The toner described in Patent document 6 is composed of the product of crosslinking an unsaturated polyester resin and a saturated polyester resin with a melt start temperature of between 50° C. and 100° C. The toner has a wide non-offset range but insufficient image fixing strength at low temperatures of 140° C. and below.

Therefore, no polyester resin for toner exists that can produce a toner with excellent high-temperature offset resistance together with a wide fixing range of 50° C. and above, sufficient fixing strength even at fixing temperatures of 140° C. and below, and satisfactory storage stability and durability.

Patent document 1: Japanese Unexamined Patent Publication SHO No. 57-109825
Patent document 2: Japanese Unexamined Patent Publication HEI No. 4-12367
Patent document 3: Japanese Unexamined Patent Publication HEI No. 3-135578
Patent document 4: Japanese Unexamined Patent Publication HEI No. 6-130722
Patent document 5: Japanese Unexamined Patent Publication SHO No. 59-49551
Patent document 6: Japanese Unexamined Patent Publication HEI No. 8-152743

DISCLOSURE OF THE INVENTION

Problems to be Solved by the Invention

It is an object of the present invention to provide a toner suitable for printers and copying machines, and especially a toner with low-temperature fixability that can produce sufficient fixing strength even at fixing temperatures of 140° C. and below, excellent high-temperature offset resistance, a wide fixing temperature range of 50° C. and higher, and satisfactory storage stability and durability, as well as a binding resin for use in the same.

Means for Solving the Problems

The first aspect of the invention for achieving the object stated above is a polyester resin for toner (1) with a peak molecular weight of at least 12,000 in gel permeation chromatography and containing an unsaturated double bond.

The second aspect of the invention is a polyester resin for toner obtained by crosslinking reaction of polyester resin for toner (1) with a peak molecular weight of at least 12,000 in gel permeation chromatography and containing an unsaturated double bond.

The third aspect of the invention is a polyester resin for toner comprising polyester resin for toner (1) with a peak molecular weight of at least 12,000 in gel permeation chromatography and containing an unsaturated double bond, and polyester resin for toner (2) with a peak molecular weight of less than 12,000 in gel permeation chromatography.

The fourth aspect of the invention is a polyester resin for toner obtained by crosslinking reaction of a polyester resin for toner comprising polyester resin for toner (1) with a peak molecular weight of at least 12,000 in gel permeation chromatography and containing an unsaturated double bond, and polyester resin for toner (2) with a peak molecular weight of less than 12,000 in gel permeation chromatography.

The fifth aspect of the invention is a polyester resin for toner comprising a THF-soluble fraction and a THF-insoluble fraction, wherein the ratio of the mass-average molecular weight/number-average molecular weight (Mw/Mn) of the THF-soluble fraction is 6 or greater and the sum of the acid value and hydroxyl value of the THF-insoluble fraction is no greater than 40 mgKOH/g.

The sixth aspect of the invention is a toner obtained by melt kneading a polyester resin for toner according to any one of the first to six aspects of the invention, a release agent and a coloring agent.

The seventh aspect of the invention is a process for production of a polyester resin for toner comprising blending and crosslinking polyester resin for toner (1) with a peak molecular weight of at least 12,000 in gel permeation chromatography and containing an unsaturated double bond, and polyester resin for toner (2) with a peak molecular weight of less than 12,000 in gel permeation chromatography.

Effect of the Invention

According to the invention it is possible to obtain toner suitable for printers and copying machines, as toner with low-temperature fixability that can produce sufficient fixing strength even at fixing temperatures of 140° C. and below, excellent high-temperature offset resistance, a wide fixing temperature range of 50° C. and higher, and satisfactory storage stability and durability.

BEST MODE FOR CARRYING OUT THE INVENTION

The first aspect of the invention is a polyester resin for toner (1) with a peak molecular weight of at least 12,000 in gel permeation chromatography and containing an unsaturated double bond.

The term "unsaturated double bond" used here refers to a double bond between carbon atoms, which may be on the main chain and/or a side chain of the polyester resin. For an unsaturated double bond on the main chain and/or side chain of the polyester resin, a carboxylic acid compound with an unsaturated double bond and/or an alcohol compound with an unsaturated double bond may be used for polycondensation reaction to incorporate these compounds as constituent components of the polyester resin.

There are no particular restrictions on the carboxylic acid compound with an unsaturated double bond, and as examples there may be mentioned fumaric acid, maleic acid, maleic anhydride, citraconic acid, itaconic acid, tetrahydrophthalic acid and their ester derivatives, and acrylic acid, crotonic acid, methacrylic acid and their ester derivatives. There are also no particular restrictions on the alcohol compound with an unsaturated double bond, and 1,4-dihydroxy-2-butene may be mentioned as an example.

From the viewpoint of reactivity, one or more selected from among fumaric acid, maleic acid and maleic anhydride are particularly preferred.

The unsaturated double bond content is not particularly restricted, but when the unsaturated double bond-containing constituent component is a carboxylic acid compound it is preferably used at 1-50 parts by mol to 100 parts by mol of acid components in polyester resin (1), and when the unsaturated double bond-containing constituent component is an alcohol compound, it is preferably used at 1-50 parts by mol to 100 parts by mol of acid components in polyester resin (1). When both are used, their total is preferably 1-50 parts by mol. An unsaturated double bond content of 1 part by mol or greater will tend to produce toner with satisfactory high-temperature offset resistance and permit an effective crosslinking reaction to take place as described below. An unsaturated double bond content of no greater than 50 parts by mol will tend to produce a toner with a satisfactory shelf life, while producing crosslinking components that are soluble in tetrahydrofuran (THF) in the crosslinking reaction described hereunder. The lower limit for the content is more preferably 3 parts by mol and most preferably 5 parts by mol. The upper limit for the content is more preferably 45 parts by mol, even more preferably 40 parts by mol, particularly preferably 35 parts by mol and most preferably 30 parts by mol.

Polyester resin (1) may also contain as a constituent component in addition to the carboxylic acid compound with an unsaturated double bond and/or alcohol compound with an unsaturated double bond mentioned above, also a component derived from a divalent carboxylic acid compound with no unsaturated double bond and a divalent alcohol compound with no unsaturated double bond.

There are no particular restrictions on the divalent carboxylic acid compound with no unsaturated double bond, and as examples there may be mentioned dicarboxylic acids such as terephthalic acid, isophthalic acid, orthophthalic acid, sebacic acid, adipic acid, succinic acid, glutaric acid, methaconic acid, citraconic acid, glutaconic acid, cyclohexanedicarboxylic acid, alkenylsuccinic acid, malonic acid and linoleic acid; as well as their alkyl esters (monomethyl esters, dimethyl esters, monoethyl esters, diethyl esters, monobutyl esters or dibutyl esters); and their dicarboxylic acid anhydrides. These divalent carboxylic acid compounds may be used alone or in combinations of two or more.

Preferred among these from the viewpoint of handleability and cost are terephthalic acid, isophthalic acid and their alkyl esters. Terephthalic acid and isophthalic acid are especially preferred because of their high reactivity with carboxylic acid compounds lacking unsaturated double bonds, and because they tend to result in satisfactory toner durability.

The content of the constituent component derived from a divalent carboxylic acid compound with no unsaturated double bond is not particularly restricted, but is preferably at least 50 parts by mol to 100 parts by mol of acid components in polyester resin (1). A content of at least 50 parts by mol will tend to yield a polyester resin with satisfactory production stability, while producing crosslinking components that are soluble in THF in the crosslinking reaction described hereunder. The lower limit for the content is more preferably 55 parts by mol, even more preferably 60 parts by mol, particularly preferably 65 parts by mol and most preferably 70 parts by mol. The upper limit for the content is not particularly restricted but is preferably 99 parts by mol, even more preferably 97 parts by mol and most preferably 95 parts by mol.

The divalent alcohol compound with no unsaturated double bond is not particularly restricted, and as examples there may be mentioned divalent aromatic alcohols such as polyoxyethylene-(2.0)-2,2-bis(4-hydroxyphenyl)propane, polyoxypropylene-(2.0)-2,2-bis(4-hydroxyphenyl)propane, polyoxypropylene(2.2)-polyoxyethylene-(2.0)-2,2-bis(4-hydroxyphenyl)propane, polyoxypropylene (6)-2,2-bis(4-hydroxyphenyl)propane, polyoxypropylene(2.3)-2,2-bis(4-hydroxyphenyl)propane and polyoxypropylene(3.3)-2,2-bis(4-hydroxyphenyl)propane; divalent aliphatic alcohols such as ethylene glycol, polyethylene glycol, 1,2-propanediol, 1,3-butanediol, 2,3-butanediol, 1,4-butanediol, diethylene glycol, 2-methyl-1,3-propanediol, triethylene glycol, neopentyl glycol, 1,6-hexanediol, 1,8-octanediol, 1,10-decanediol and 1,12-dodecanediol; or 1,2-cyclohexanedimethanol, 1,4-cyclohexanedimethanol, bisphenol hydride A, bisphenol hydride A ethylene oxide addition product and divalent alicyclic alcohols such as propylene oxide addition product, spiroglycol, 1,4-cyclohexanediol, cyclodecanedimethanol and tricyclodecanedimethanol, any of which may be used alone or in combinations of two or more.

Preferred among the above as constituent components for polyester resin (1) are divalent aliphatic alcohol compounds and/or divalent alicyclic alcohol compounds. Adding a divalent aliphatic alcohol compound and/or divalent alicyclic alcohol compound as a constituent component in polyester resin (1) will tend to result in a much more satisfactory low-temperature fixability of the toner. Ethylene glycol and neopentyl glycol are particularly preferred among the aforementioned divalent aliphatic alcohol compounds. A particularly preferred divalent alicyclic alcohol compound is 1,4-cyclohexanedimethanol.

From the viewpoint of achieving an effective crosslinking reaction, 1,4-cyclohexanedimethanol is most preferred among the above.

The content of the constituent component derived from a divalent alcohol compound with no unsaturated bond is not particularly restricted, but is preferably at least 80 parts by mol to 100 parts by mol of acid components in polyester resin (1). A content of 80 parts by mol or greater will tend to result in a polyester resin with more satisfactory production stability. The lower limit for the content is more preferably 90 parts by mol and most preferably 95 parts by mol. The upper limit for the content is not particularly restricted but it preferably 150 parts by mol, more preferably 140 parts by mol, even more preferably 130 parts by mol and most preferably 120 parts by mol.

The content of the constituent component derived from a divalent aliphatic alcohol compound and/or a divalent alicyclic alcohol compound is not particularly restricted, but is preferably at least 50 parts by mol to 100 parts by mol of acid components in polyester resin (1). A content of at least 50 parts by mol will tend to result in a toner with a more satisfactory low-temperature fixability. The lower limit for the content is more preferably 60 parts by mol and most preferably 70 parts by mol. The upper limit for the content is not particularly restricted but is preferably 150 parts by mol.

Polyester resin (1) may also contain as a constituent component, in addition to the constituent component derived from a carboxylic acid compound with an unsaturated double bond and/or alcohol compound with an unsaturated double bond, and the constituent component derived from a divalent carboxylic acid compound with no unsaturated double bond and a divalent alcohol compound with no unsaturated double bond, also a constituent component derived from a monovalent carboxylic acid compound and/or monovalent alcohol compound and a constituent component derived from a trivalent or greater carboxylic acid compound and/or a trivalent or greater alcohol compound.

As monovalent carboxylic acid compounds there may be mentioned aromatic carboxylic acids with up to 30 carbon atoms such as benzoic acid and p-methylbenzoic acid, and aliphatic carboxylic acids with up to 30 carbon atoms such as stearic acid and behenic acid.

As monovalent alcohol compounds there may be mentioned aromatic alcohols with up to 30 carbon atoms such as benzyl alcohol, and aliphatic alcohols with up to 30 carbon atoms such as lauryl alcohol, cetyl alcohol, stearyl alcohol, behenyl alcohol and the like.

The content of the constituent component derived from a monovalent carboxylic acid compound is not particularly restricted, but is preferably at least 0.1-10 parts by mol to 100 parts by mol of acid components in polyester resin (1). The content of the constituent component derived from a monovalent alcohol compound is not particularly restricted, but is preferably at least 0.1-10 parts by mol to 100 parts by mol of acid components in polyester resin (1). When both are used, their total is preferably 0.1-10 parts by mol. If the content of the constituent component derived from a monovalent carboxylic acid compound and/or monovalent alcohol compound is at least 0.1 part by mol it will be easier to control the molecular weight of the polyester resin, and if it is no greater than 10 parts by mol the toner storage stability will tend to be increased. The lower limit for the content is more preferably 0.2 part by mol and most preferably 0.5 part by mol. The upper limit for the content is more preferably 9 parts by mol and most preferably 8 parts by mol.

The trivalent or greater carboxylic acid compound is not particularly restricted, and there may be mentioned trimellitic acid, trimellitic anhydride and pyromellitic acid.

As trivalent and greater alcohol compounds there may be mentioned trimethylolpropane, pentaerythritol, glycerin and the like.

The content of the constituent component derived from a trivalent or greater carboxylic acid compound is not particularly restricted, but is preferably 0.1-30 parts by mol to 100 parts by mol of acid components in polyester resin (1). The content of the constituent component derived from a trivalent or greater alcohol compound is not particularly restricted, but is preferably 0.1-30 parts by mol to 100 parts by mol of acid components in polyester resin (1). When both are used, their total is preferably 0.1-30 parts by mol. If the content of the constituent component derived from a trivalent or greater carboxylic acid compound and/or trivalent or greater alcohol compound is at least 0.1 part by mol the toner will tend to exhibit satisfactory high-temperature offset resistance, while if it is no greater than 30 parts by mol the low-temperature fixability of the toner will tend to be more satisfactory. The lower limit for the content is more preferably 0.5 part by mol and most preferably 1 part by mol. The upper limit for the content is more preferably 25 parts by mol and most preferably 10 parts by mol.

Polyester resin (1) has a peak molecular weight (Mp) of at least 12,000 in gel permeation chromatography (GPC). A peak molecular weight of 12,000 or higher will tend to result in sufficient fixing strength even at low fixing temperatures of 140° C. and below while maintaining satisfactory high-temperature offset resistance.

According to the invention, the peak molecular weight (Mp) in GPC is the molecular weight determined from the peak value of the elution curve obtained by GPC measurement. The measuring conditions for GPC were as follows.

Apparatus: HLC8020, Toyo Soda Manufacturing Co., Ltd.

Column: TSKgel GMHXL (column size: 7.8 mm (ID)×30.0 cm (L)) by Toyo Soda Manufacturing Co., Ltd., three columns linked in series.

Oven temperature: 40° C.

Eluent: THF

The peak molecular weight (Mp) was determined by drawing a calibration curve for standard polystyrene from the retention time corresponding to the peak value of the obtained elution curve.

The standard polystyrene samples used for the calibration curve were TSK standard, A-500 (molecular weight: $5.0\times10^2$), A-2500 (molecular weight: $2.74\times10^3$), F-2 (molecular weight: $1.96\times10^4$), F-20 (molecular weight: $1.9\times10^5$), F-40 (molecular weight: $3.55\times10^5$), F-80 (molecular weight: $7.06\times10^5$), F-128 (molecular weight: $1.09\times10^6$), F-288 (molecular weight: $2.89\times10^6$), F-700 (molecular weight: $6.77\times10^6$) and F-2000 (molecular weight: $2.0\times10^7$), by Toyo Soda Manufacturing Co., Ltd.

The peak value of the elution curve is the point where the elution curve is at maximum, and where two maximum points exist it is the maximum value of the elution curve. The eluent is not particularly restricted and may be any solvent that dissolves the polyester resin, such as chloroform, instead of THF.

The peak molecular weight (Mp) of polyester resin (1) is preferably at least 14,000, more preferably at least 16,000, even more preferably at least 17,500 and most preferably at least 20,000. The upper limit for the peak molecular weight (Mp) of polyester resin (1) is not particularly restricted but is preferably 1,000,000, more preferably 500,000 and most preferably 200,000.

The mass-average molecular weight (Mw) of polyester resin (1) is not particularly restricted but is preferably at least 15,000. If the Mw of polyester resin (1) is at least 15,000, the toner will tend to exhibit more satisfactory high-temperature offset resistance.

The upper limit for the Mw of polyester resin (1) is not particularly restricted but is preferably 1,000,000 from the viewpoint of the low-temperature fixability of the toner.

The number-average molecular weight (Mn) of polyester resin (1) is also not particularly restricted but is preferably at least 4,500. If the Mn of polyester resin (1) is at least 4,500, the fixing strength will tend to be sufficient even at low fixing temperatures of below 140° C. The upper limit for the Mn of polyester resin (1) is not particularly restricted but is preferably 100,000 from the viewpoint of the low-temperature fixability of the toner.

Polyester resin (1) may be a straight-chain resin or a branched or reticulated resin resulting from a trivalent or greater carboxylic acid compound or trivalent or greater alcohol compound. It may also consist of a mixture of a straight-chain resin and a branched or reticulated resin.

The softening temperature of polyester resin (1) is not particularly restricted but is preferably 120-230° C. A polyester resin (1) with a softening temperature of at least 120° C. will tend to result in a toner with satisfactory high-temperature offset resistance, while a softening temperature of no higher than 230° C. will tend to result in a toner with satisfactory low-temperature fixability. The lower limit for the softening temperature of polyester resin (1) is not particularly restricted but is preferably at least 125° C., more preferably at least 135° C., even more preferably at least 140° C., yet more preferably at least 145° C., even yet more preferably at least 150° C. and most preferably at least 160° C. The upper limit for the softening temperature of polyester resin (1) is more preferably no higher than 220° C. and especially no higher than 210° C.

The glass transition temperature (Tg) of polyester resin (1) is not particularly restricted but is preferably in the range of 45-80° C. A polyester resin (1) with a Tg of at least 45° C. will tend to result in a toner with satisfactory storage stability, while a Tg of no higher than 80° C. will tend to result in a toner with satisfactory low-temperature fixability. The lower limit for the Tg of polyester resin (1) is more preferably 50° C. and the upper limit is more preferably 75° C.

The acid value of polyester resin (1) is not particularly restricted but is preferably no greater than 10 mgKOH/g. If the acid value of polyester resin (1) is no greater than 10 mgKOH/g, the toner will tend to exhibit more satisfactory fixed image density. The upper limit for the acid value of polyester resin (1) is more preferably no greater than 8 mgKOH/g. The lower limit for the acid value of polyester resin (1) is not particularly restricted but is preferably 0.1 mgKOH/g.

The second aspect of the invention will now be explained.

The second aspect of the invention is a polyester resin for toner obtained by crosslinking reaction of polyester resin for toner (1) which has a peak molecular weight of at least 12,000 in gel permeation chromatography and contains an unsaturated double bond.

Polyester resin (1) may be used directly as a toner binding resin, but it is preferably subjected to crosslinking reaction.

When polyester resin (1) is crosslinked, a portion thereof is converted to a crosslinked fraction with high crosslink density that is incapable of dissolving in THF (THF-insoluble fraction) and a portion thereof is converted to a crosslinked fraction with low crosslink density that can dissolve in THF, while the rest remains unreacted. A resin obtained by crosslinking reaction therefore contains a THF-insoluble fraction (crosslinked fraction that is insoluble in THF) and a THF-soluble fraction (crosslinked fraction that is soluble in THF, and the unreacted polyester resin (1)). Because the THF-insoluble fraction is crosslinked at high density, it acts to impart even higher elasticity to the toner, thus tending to produce a toner with more satisfactory high-temperature offset resistance.

Production of a THF-soluble crosslinked fraction can be confirmed by comparing the distribution curve from gel permeation chromatography of polyester resin (1) before crosslinking reaction with the distribution curve from gel permeation chromatography of the THF-soluble fraction of polyester resin (1) after crosslinking reaction. That is, because the crosslinked fraction that dissolves in THF is produced by the crosslinking reaction, the distribution curve from gel permeation chromatography after crosslinking reaction is pushed slightly more toward the high-molecular-weight end than the distribution curve from gel permeation chromatography before crosslinking reaction, and therefore the molecular weight distribution (Mw/Mn) after crosslinking reaction is greater than the molecular weight distribution (Mw/Mn) before crosslinking reaction. For effective crosslinking reaction of polyester resin (1), it is preferred to add a 1,4-cyclohexanedimethanol component as a constituent component of polyester resin (1).

The polyester resin for toner obtained by crosslinking reaction of polyester resin (1) may include a polyester resin (1') having a peak molecular weight of 12,000 or greater in gel permeation chromatography and comprising no unsaturated double bond.

The third aspect of the invention will now be explained.

The third aspect of the invention is a polyester resin for toner comprising polyester resin for toner (1) with a peak molecular weight of at least 12,000 in gel permeation chromatography and containing an unsaturated double bond, and polyester resin for toner (2) with a peak molecular weight of less than 12,000 in gel permeation chromatography.

Polyester resin (1) may be used alone as a toner binding resin, but preferably it is used in combination with polyester resin (2) having a peak molecular weight of less than 12,000. Using a combination of polyester resin (1) and polyester resin (2) as the toner binding resin will tend to yield a toner with a more satisfactory low-temperature fixability. Presumably this is because polyester resin (2) melts sharply at low temperature.

The upper limit for the peak molecular weight of polyester resin (2) is preferably 11,000 and most preferably 10,000. The lower limit for the peak molecular weight of polyester resin (2) is not particularly restricted but is preferably 2,000 from the viewpoint of the storage stability of the toner.

The Mw of polyester resin (2) is not particularly restricted but is preferably no greater than 12,000 from the viewpoint of the low-temperature fixability of the toner. The upper limit for the Mw of polyester resin (2) is most preferably 11,000. The lower limit for the Mw of polyester resin (2) is not particularly restricted but is preferably 4,000 from the viewpoint of the storage stability of the toner.

The Mn of polyester resin (2) is not particularly restricted but is preferably no greater than 4,500 from the viewpoint of the low-temperature fixability of the toner. The upper limit for the Mn of polyester resin (2) is most preferably 4,000. The lower limit for the Mn of polyester resin (2) is not particularly restricted but is preferably 1,000 from the viewpoint of the storage stability of the toner.

The softening temperature of polyester resin (2) is not particularly restricted but is preferably 80-130° C. The lower limit for the softening temperature of polyester resin (2) is more preferably 85° C. and most preferably 90° C. The upper limit for the softening temperature of polyester resin (2) is more preferably 120° C. and most preferably 115° C.

The Tg of polyester resin (2) is not particularly restricted but is preferably in the range of 40-70° C. A polyester resin (2) with a Tg of at least 40° C. will tend to result in a toner with satisfactory storage stability, while a Tg of no higher than 70° C. will tend to result in a toner with satisfactory low-temperature fixability. The lower limit for the Tg of polyester resin (2) is more preferably 45° C. and the upper limit is more preferably 65° C.

The acid value of polyester resin (2) is not particularly restricted but is preferably no greater than 50 mgKOH/g. If the acid value of polyester resin (2) is no greater than 50 mgKOH/g, the toner will tend to exhibit a more satisfactory fixed image density. The upper limit for the acid value of polyester resin (2) is more preferably no greater than 40 mgKOH/g. The lower limit for the acid value of polyester resin (2) is not particularly restricted but is preferably 1 mgKOH/g.

The constituent components of polyester resin (2) are not particularly restricted, and there may be used the same components mentioned above as examples of constituent components for polyester resin (1). There may also be used divalent carboxylic acid compounds with unsaturated double bonds, divalent carboxylic acid compounds with no unsaturated bonds, dihydric alcohol compounds with unsaturated bonds, dihydric alcohol compounds with no unsaturated bonds or trivalent carboxylic acid compounds, trihydric alcohol compounds, monovalent carboxylic acid compounds and monohydric alcohol compounds with no unsaturated bonds, which were mentioned above as examples of constituent components for polyester resin (1). The preferred range for the content of these constituent components in polyester resin (2) is the same as the preferred range for the constituent components in polyester resin (1) specified above.

However, the preferred types of constituent components in the polyester resin differ for polyester resin (1) and polyester resin (2). For example, preferred dihydric alcohol components for polyester resin (2), from the viewpoint of storage stability, are bisphenol A propylene oxide addition products such as polyoxypropylene-(2.0)-2,2-bis(4-hydroxyphenyl)propane, polyoxypropylene(6)-2,2-bis(4-hydroxyphenyl)propane, polyoxypropylene(2.3)-2,2-bis(4-hydroxyphenyl)propane and polyoxypropylene(3.3)-2,2-bis(4-hydroxyphenyl)propane, while neopentyl glycol is preferred from the viewpoint of the low-temperature fixability.

Polyester resin (2) preferably contains a constituent component derived from a C30 or greater monovalent carboxylic acid compound and/or C30 or greater monohydric alcohol compound. If polyester resin (2) contains a C30 or greater monovalent carboxylic acid compound and/or C30 or greater monohydric alcohol compound as a constituent component, the dispersibility of the release agent added during toner production will generally be more satisfactory, the high-temperature offset resistance can be improved and the fixing range will tend to be broader.

The following industrially available compounds may be mentioned as C30 or greater monovalent carboxylic acid compounds and/or C30 or greater monohydric alcohol compounds, although they are not restrictive.

(i) Compounds with a hydroxyl group at one end of C30 or greater polyethylene. For example, compounds among the Uniline series by Toyo Petrolite which have number-average molecular weights of 438 and greater.

(ii) Compounds with a carboxyl group at one end of C30 or greater polyethylene. For example, compounds among the Unisid series by Toyo Petrolite which have number-average molecular weights of 438 and greater.

(iii) Compounds based on polypropylene with a number-average molecular weight (Mn) of 1000 (~C70) which are maleic acid-modified at one end.

Polyester resin (2) may be a polyester resin with an unsaturated double bond or a saturated polyester resin with no unsaturated double bonds.

The difference in softening temperature between polyester resin (1) and polyester resin (2) is not particularly restricted but is preferably at least 20° C. A softening temperature difference of at least 20° C. will tend to result in a toner with a satisfactory balance between low-temperature fixability and high-temperature offset resistance. The lower limit for the softening temperature difference is more preferably at least 40° C. and especially at least 50° C. The upper limit for the softening temperature difference is not particularly restricted but is preferably no more than 150° C.

The mixing proportion of polyester resin (1) and polyester resin (2) is not particularly restricted, but is preferably 1/99-99/1 (by mass). A mixing proportion within this range will tend to yield a toner with satisfactory low-temperature fixability. The mixing proportion is more preferably 1/99-50/50, even more preferably 1/99-40/60, yet more preferably 1/99-30/70, even yet more preferably 1/99-20/80 and most preferably 5/95-20/80.

The difference in the solubility parameter (SP value) between polyester resin (1) and polyester resin (2) is not particularly restricted but is preferably no greater than 1. A difference in SP of no greater than 1 $(cal/cm^3)^{1/2}$ will tend to yield a polyester resin with satisfactory miscibility and a better balance between low-temperature fixability and storage stability. The difference in SP is more preferably 0.8 $(cal/cm^3)^{1/2}$, even more preferably no greater than 0.6 $(cal/cm^3)^{1/2}$ and most preferably no greater than 0.4 $(cal/cm^3)^{1/2}$.

The SP value is calculated according to the known Fedors method, ignoring the end groups (hydroxyl, carboxyl, etc.) since the ends of the polyester molecular chain have minimal effect on solubility.

According to the invention, a crystalline polyester may be used as the binding resin in the toner, but from the viewpoint of achieving more favorable toner fixability, polyester resin (1) and polyester resin (2) are preferably both amorphous polyester resins with no melting point.

The fourth aspect of the invention will now be explained.

The fourth aspect of the invention is a polyester resin for toner obtained by crosslinking reaction of a polyester resin for toner comprising polyester resin for toner (1) with a peak molecular weight of at least 12,000 in gel permeation chromatography and containing an unsaturated double bond, and polyester resin for toner (2) with a peak molecular weight of less than 12,000 in gel permeation chromatography.

The polyester resin for toner comprising polyester resin (1) and polyester resin (2) may be used directly as the toner binding resin, but it is preferably subjected to crosslinking reaction.

When the polyester resin for toner comprising polyester resin (1) and polyester resin (2) is crosslinked, a portion thereof is converted to a crosslinked fraction with high crosslink density that is incapable of dissolving in THF (THF-insoluble fraction) and a portion thereof is converted to a crosslinked fraction with low crosslink density that dissolves in THF, while the rest remains unreacted. A resin obtained by crosslinking reaction therefore contains a THF-insoluble fraction (crosslinked fraction that is insoluble in THF) and a THF-soluble fraction (crosslinked fraction that is soluble in THF, and the unreacted polyester resin (1) and unreacted polyester resin (2)).

The unreacted polyester resin (2) in the THF-soluble fraction acts to impart low-temperature fixability to the toner. The unreacted polyester resin (1) in the THF-soluble fraction acts to impart elasticity to the toner. Because the THF-insoluble fraction is crosslinked at high density, it results in a toner with an even higher elastic modulus. The crosslinked components in the THF-soluble fraction that dissolve in THF result in more satisfactory compatibility between the THF-insoluble fraction and the unreacted polyester resin (1) and unreacted polyester resin (2).

Consequently, a polyester resin for toner obtained by crosslinking reaction of a polyester resin for toner comprising polyester resin (1) and polyester resin (2) maintains satisfactory low-temperature fixability while exhibiting increased high-temperature offset resistance and a markedly broader fixing temperature range.

For crosslinking reaction of the polyester resin for toner comprising polyester resin (1) and polyester resin (2), it is preferred for polyester resin (2) to contain an unsaturated double bond. When polyester resin (2) contains an unsaturated double bond, polyester resin (2) will also be incorporated into the crosslinked components, tending to result in a smaller THF-insoluble fraction and more satisfactory toner storage stability and durability.

The size of the THF-insoluble fraction can be controlled by adjusting the number of unsaturated double bonds in polyester resin (2) and the content of polyester resin (2). The number of unsaturated double bonds in polyester resin (2) is preferably no greater than the number of unsaturated double bonds in polyester resin (1). If the number of unsaturated bonds in polyester resin (2) is no greater than the number of unsaturated bonds in polyester resin (1), the storage stability and durability will tend to be more satisfactory while the balance between low-temperature fixability and high-temperature offset resistance will be maintained.

The fifth aspect of the invention will now be explained.

The fifth aspect of the invention is a polyester resin for toner comprising a THF-soluble fraction and a THF-insoluble fraction, wherein the ratio of the mass-average molecular weight (Mw)/number-average molecular weight (Mn) (Mw/Mn) of the THF-soluble fraction is 6 or greater and the sum of the acid value and hydroxyl value of the THF-insoluble fraction is no greater than 40 mgKOH/g.

The THF-soluble fraction is the component that elutes into THF when the polyester resin is dissolved in THF under reflux, and the THF-insoluble fraction is the component that does not elute into THF under the same conditions.

The mass-average molecular weight/number-average molecular weight ratio (Mw/Mn) of the THF-soluble fraction is not particularly restricted but is preferably at least 6. A Mw/Mn of 6 or greater for the THF-soluble fraction corresponds to a broader molecular weight distribution of the THF-soluble fraction, and a Mw/Mn of 6 or greater will tend to result in a toner with particularly satisfactory durability. The lower limit for the Mw/Mn is preferably 10, more preferably 20 and even more preferably 40. The upper limit for Mw/Mn of the THF-soluble fraction is not particularly restricted but is preferably 5,000, more preferably 4,000 and even more preferably 3,000.

The THF-soluble fraction is not particularly restricted so long as Mw/Mn is 6 or greater, but it preferably has a peak at molecular weight 10,000 or below, and the ratio of the signal strength of the GPC curve at molecular weight 100,000 (I(M100,000)) with respect to the signal strength of the GPC curve at peak molecular weight (I(Mp)) (I(M100,000)/I(Mp)) is preferably in the range of 0.04-0.2. The ratio (I(M100,000)/I(Mp)) is an index of the THF-soluble high-molecular-weight component content, and a (I(M100,000)/I(Mp)) ratio of 0.04 or greater will tend to result in better compatibility between the THF-insoluble fraction and THF-soluble low molecular components, as well as more even dispersion of the THF-insoluble fraction and more satisfactory toner durability. If the (I(M100,000)/I(Mp)) ratio is no greater than 0.2, the low-temperature fixability of the toner will tend to be more satisfactory. The lower limit for this ratio is more preferably 0.05, and the upper limit is more preferably 0.15.

The signal strength of the GPC curve at peak molecular weight (I(Mp)) and the signal strength of the GPC curve at molecular weight 100,000 (I(M100,000)) are, respectively, the difference between the baseline signal strength and the signal strength at peak molecular weight and the difference between baseline signal strength and the signal strength at molecular weight 100,000, and they are represented as potentials (mV).

The THF-soluble fraction preferably includes the crosslinked components that dissolve in THF. If the THF-soluble fraction includes the crosslinked components that dissolve in THF, the compatibility between the THF-insoluble fraction and the THF-soluble low molecular components will be more satisfactory, the THF-insoluble fraction will disperse more evenly and the toner durability will tend to be further improved.

The acid value of the THF-insoluble fraction is not particularly restricted but is preferably no greater than 15 mgKOH/g, more preferably no greater than 12 mgKOH/g, even more preferably no greater than 10 mgKOH/g and most preferably no greater than 8 mgKOH/g. The lower limit for the acid value, likewise, is not particularly restricted but is preferably 0.1 mgKOH/g.

The hydroxyl value of the THF-insoluble fraction is also not particularly restricted but is preferably no greater than 35 mgKOH/g and more preferably no greater than 32 mgKOH/g. The lower limit for the hydroxyl value, likewise, is not particularly restricted but is preferably 0.1 mgKOH/g.

The sum of the acid value and hydroxyl value of the THF-insoluble fraction is not particularly restricted but is preferably no greater than 40 mgKOH/g. If the sum of the acid value and hydroxyl value of the THF-insoluble fraction is no greater than 40 mgKOH/g, the toner durability will tend to be notably improved. The upper limit for the sum of the acid value and hydroxyl value of the THF-insoluble fraction is preferably no greater than 38 mgKOH/g. The lower limit for the acid value and hydroxyl value of the THF-insoluble fraction is also not particularly restricted, but from the standpoint of durability it is preferably at least 0.2 mgKOH/g, more preferably at least 1 mgKOH/g, even more preferably at least 5 mgKOH/g and most preferably at least 10 mgKOH/g.

Since the polyester resin is produced by condensation polymerization of an acid and alcohol as described hereunder, the ends will generally be acid-terminated or alcohol-terminated (hydroxy-terminated). A smaller molecular weight of the polyester resin (a lower degree of condensation) will therefore increase the number of ends per unit weight and lead to a larger total of the acid value and hydroxyl value. Conversely, a larger molecular weight of the polyester resin (a higher degree of condensation) will decrease the number of ends per unit weight and lead to a smaller total of the acid value and hydroxyl value. The THF-insoluble fraction consists of components with a non-linear structure that do not elute in THF, i.e. the high density crosslinked components.

A THF-insoluble fraction with an acid value and hydroxyl value sum of no greater than 40 mgKOH/g therefore corresponds to high-density crosslinking in a high-molecular-weight polyester resin with a high degree of condensation. Thus, a THF-insoluble fraction with an acid value and hydroxyl value sum of no greater than 40 mgKOH/g can result in high-temperature offset resistance with a smaller content to exhibit an effect of both low-temperature fixability and high-temperature offset resistance, as well as a broad fixing temperature range.

Therefore, when the Mw/Mn of the THF-soluble fraction of the polyester resin for toner is 6 or greater and the sum of the acid value and hydroxyl value of the THF-insoluble fraction is no greater than 40 mgKOH/g, it is possible to achieve more satisfactory performance including high-temperature offset resistance, low-temperature fixability, fixing temperature range, storage stability and durability.

The THF-soluble fraction content is not particularly restricted but is preferably no greater than 95 mass % of the binding resin in the toner. If the THF-soluble fraction is no greater than 95 mass %, the high-temperature offset resistance of the toner will tend to be more satisfactory. The upper limit for the THF-soluble fraction content is most preferably no greater than 93 mass %. The lower limit for the THF-soluble fraction content is also not particularly restricted but is preferably 60 mass %. If the THF-soluble fraction is at least 60 mass %, the low-temperature fixability of the toner will tend to be more satisfactory. The lower limit for the THF-soluble fraction content is most preferably 65 mass %.

The THF-insoluble fraction content is not particularly restricted but is preferably at least 5 mass % of the binding resin in the toner. If the THF-insoluble fraction is at least 5 mass %, the high-temperature offset resistance of the toner will tend to be more satisfactory. The lower limit for the THF-insoluble fraction content is most preferably 7 mass %. The upper limit for the THF-insoluble fraction content is also not particularly restricted but is preferably 40 mass %. If the THF-insoluble fraction is no greater than 40 mass %, the low-temperature fixability of the toner will tend to be more satisfactory. The upper limit for the THF-insoluble fraction content is most preferably 35 mass %.

A process for production of a polyester resin for toner according to the invention will now be explained.

The production process for polyester resin (1) polyester resin (2) is not particularly restricted, and any process known in the prior art may be employed. For example, the carboxylic acid compound and alcohol compound may be charged together for esterification or transesterification and polymerization by condensation reaction to produce the polyester resin. For polymerization of the polyester resin, a polymerization catalyst such as titanium tetrabutoxide, dibutyltin oxide, tin acetate, zinc acetate, tin disulfide, antimony trioxide or germanium dioxide may be used. The polymerization temperature is not particularly restricted but is preferably in the range of 180° C.-290° C. For the polyester resin (2) with a peak molecular weight of less than 12,000, synthesis can be accomplished without using a catalyst.

The carboxylic acid compound and alcohol compound may be charged together with a release agent component for esterification or transesterification and polymerization by condensation reaction to produce the polyester resin, or in other words, internal addition of the release agent component.

A stabilizer may also be added to stabilize polymerization of the polyester. As stabilizers there may be mentioned hydroquinone, methylhydroquinone, hindered phenol compounds and the like.

A process for production of a polyester resin for toner obtained by crosslinking reaction of polyester resin (1) will now be explained.

The crosslinking reaction of the polyester resin (1) forms chemical bonds between the polyester resin molecules.

There are no particular restrictions on the form of the crosslinking reaction, and for example, the unsaturated double bonds in the polyester resin (1) may be reacted by radical addition reaction, cationic addition reaction or anionic addition reaction to form intermolecular carbon-carbon bonds, or intermolecular bonds may be formed by condensation reaction, polyaddition reaction or transesterification of the tribasic or greater carboxylic acids, trihydric or greater polyhydric alcohols, trivalent or greater epoxy groups or trivalent or greater isocyanate groups in the polyester resin.

Of these reactions, radical addition reaction, cationic addition reaction or anionic addition reaction of the unsaturated double bonds in the polyester resin to form intermolecular carbon-carbon bonds is preferred.

Radical addition reaction, cationic addition reaction or anionic addition reaction of the unsaturated double bonds in the polyester resin to form intermolecular carbon-carbon bonds can be accelerated by active species generated by thermal reaction, photoreaction, oxidation-reduction reaction or the like. Thermal reaction is preferred among the above, with radical reaction being especially preferred. There are no particular restrictions on the radical reaction, and it may be carried out with or without the use of a radical reaction initiator. A process using a radical reaction initiator is particularly preferred from the viewpoint of effectively conducting the crosslinking reaction.

There are no particular restrictions on the radical reaction initiator, which may be an azo compound or organic peroxide. Organic peroxides are preferred for their high initiator efficiency and lack of cyanogen compound by-products.

There are no particular restrictions on organic peroxides used, and as examples there may be mentioned benzoyl peroxide, di-t-butyl peroxide, t-butylcumyl peroxide, dicumyl peroxide, α,α-bis(t-butylperoxy)diisopropylbenzene, 2,5-dimethyl-2,5-bis(t-butylperoxy)hexane, di-t-hexyl peroxide, 2,5-dimethyl-2,5-di-t-butylperoxyhexyne-3, acetyl peroxide, isobutyryl peroxide, octanonyl peroxide, decanolyl peroxide, lauroyl peroxide, 3,3,5-trimethylhexanoyl peroxide, m-toluoyl peroxide, t-butylperoxy isobutyrate, t-butylperoxy neodecanoate, cumylperoxy neodecanoate, t-butylperoxy 2-ethyl hexanoate, t-butylperoxy 3,5,5-trimethyl hexanoate, t-butylperoxy laurate, t-butylperoxy benzoate, t-butylperoxyisopropyl carbonate and t-butylperoxy acetate.

Particularly preferred among the above are reaction initiators with high ability to abstract hydrogen because they efficiently promote crosslinking reaction and can be used in smaller amounts, and especially reaction initiators with high ability to abstract hydrogen, such as benzoyl peroxide, di-t-butyl peroxide, t-butylcumyl peroxide, dicumyl peroxide, α,α-bis(t-butylperoxy)diisopropylbenzene, 2,5-dimethyl-2,5-bis(t-butylperoxy)hexane, di-t-hexyl peroxide and the like.

The amount of radical reaction initiator used is not particularly restricted, but it is preferably 0.1-10 parts by mass to 100 parts by mass of polyester resin (1). A radical reaction initiator used at 0.1 part by mass or greater will tend to promote the crosslinking reaction, while odor will be acceptable at less than 10 parts by mass. The amount used is preferably no greater than 3 parts by mass, more preferably no greater than 1 part by mass and even more preferably no greater than 0.5 part by mass.

There are no particular restrictions on the crosslinking reaction method, and for example, either of the following methods (i) or (ii) may be mentioned.

(i) A method of conducting crosslinking reaction simultaneously with polymerization of the polyester resin.

(ii) A method of conducting crosslinking reaction after polymerization of the polyester resin.

Method (ii), conducting crosslinking reaction after polymerization of the polyester resin, is preferred.

When crosslinking reaction is conducted after polymerization of the polyester resin, the polyester resin may be supplied to the crosslinking reaction while in a molten state immediately after polymerization, or it may be cooled after polymerization to obtain a solid polyester resin and then remelted for crosslinking reaction. The crosslinking reaction is not particularly restricted, and may be carried out with or without a crosslinking reaction initiator. A crosslinking reaction initiator is preferably used from the viewpoint of effectively conducting the crosslinking reaction.

There are no particular restrictions on the method of adding the crosslinking reaction initiator when crosslinking reaction is carried out after polymerization of the polyester resin. For example, the crosslinking reaction may be conducted with addition of the crosslinking reaction initiator to the polyester resin which is in a molten state immediately after polymerization, the cooled solid polyester resin may be remelted prior to addition of the crosslinking reaction initiator for crosslinking reaction, or the crosslinking reaction initiator may be added to the cooled solid polyester resin before remelting for crosslinking reaction.

When the crosslinking reaction initiator is added to the molten polyester resin, preferably a mixture of the crosslinking reaction initiator in a diluent is prepared and the mixture added to the molten polyester resin.

There are no particular restrictions when using a radical reaction initiator as the crosslinking reaction initiator. Addition of the crosslinking reaction initiator which has been diluted with a diluent will help to prevent autodecomposition of the radical reaction initiator, thus ensuring higher safety during the polyester resin production and avoiding excess consumption of the radical reaction initiator due to autodecomposition, while also reducing the amount of radical reaction initiator that must be used.

The compound used as the diluent is not particularly restricted, and it may be one of the acid or alcohol compounds used as constituent components of the polyester resin, or a low-molecular-weight polyester resin may be used as the diluent. In addition to these there may be mentioned polyvalent polyalkyl carboxylate esters, phosphoric acid esters, terpene-based resins, rosin-based esters, epoxy-based resins, polyalkylene glycols, silicon oils, release agents and the like, any of which may also be used in combinations of two or more.

Release agents are particularly preferred among the above. The diluent will remain in the polyester resin for toner, but since a release agent is used as an additive in the toner it will not adversely affect the toner performance even if it remains in the polyester resin for toner. By pre-adding the release agent to the polyester resin for toner, it is possible to achieve more satisfactory dispersibility of the release agent than when it is added during formation of the toner.

When a release agent is used as the diluent for the radical reaction initiator, it is preferred to use one that does not inhibit crosslinking reaction of the unsaturated double bonds. As agents that do not inhibit crosslinking reaction of unsaturated double bonds there are preferred hydrocarbon-based release agents, and as examples there may be mentioned aliphatic hydrocarbon-based waxes such as low-molecular-weight polyethylene, low-molecular-weight polypropylene, microcrystalline wax and paraffin wax, aliphatic hydrocarbon-based wax oxides such as polyethylene oxide wax and the like, as well as their block compounds.

The melting point of the release agent is preferably no higher than 120° C. in order to facilitate mixture with the radical reaction initiator, and in order to further increase the low-temperature fixability of the toner. The most preferred release agents with melting points of 120° C. and below are paraffin waxes, and as examples there may be mentioned the HNP series, for example, HNP-3 (melting point: 64° C.), HNP-5 (melting point: 62° C.), HNP-9, 10 (melting point: 75° C.), HNP-11 (melting point: 68° C.), HNP-12 (melting point: 67° C.) and HNP-51 (melting point: 77° C.), the SP series, for example, SP-0165 (melting point: 74° C.), SP-0160 (melting point: 71° C.), SP-0145 (melting point: 62° C.) and HNP-3 (melting point: 64° C.) and the FT series: FT-0070 (melting point: 72° C.), FT-0165 (melting point: 73° C.), by Nippon Seiro Co., Ltd.

The dilution ratio of the crosslinking reaction initiator (the mixing ratio of the crosslinking reaction initiator and release agent) is not particularly restricted, but preferably the crosslinking reaction initiator/release agent ratio (by mass) is in the range of 0.1/99.9-50/50. A ratio of 0.1/99.9 or greater will help the crosslinking reaction take place more efficiently, while a ratio of no greater than 50/50 will help prevent autodecomposition. The time for the crosslinking reaction is preferably set according to the 10 hour half-life temperature of the radical reaction initiator used, and the preferred range is 0.5 minutes-10 minutes from the viewpoint of thermal decomposition reaction of the polyester resin.

The temperature for the crosslinking reaction is also preferably set according to the 10 hour half-life temperature of the radical reaction initiator used, and the preferred range is 100° C.-250° C. from the viewpoint of thermal decomposition and crosslinking reactivity of the polyester resin.

The apparatus used for crosslinking reaction may be the same apparatus used for the polyester resin polycondensation step, but from the viewpoint of uniform admixture of the polyester resin and crosslinking reaction initiator in a short period of time, it is preferably a melt mixer.

There are no particular restrictions on the melt mixer, and as examples there may be mentioned continuous melt mixers such as single-screw extruders, twin-screw extruders, continuous enclosed mixers, gear extruders, disk extruders, roll mill extruders and static mixers, and batch-type enclosed melt mixers such as Banbury mixers, Brabender mixers and Haake mixers.

Among these, continuous melt mixers are preferred for better efficiency in a short period of time and for dispersion of the crosslinking reaction initiator in the polyester resin.

When crosslinking reaction is conducted with addition of the crosslinking reaction initiator to the polyester resin while it is molten immediately after polymerization, the melt mixer is preferably connected to a polycondensation reaction tank.

A publicly known static mixer may also be used, and the following may be mentioned as industrially available examples.

(1) SMX Sulzer mixer (SMX-15A: 6-element, 12-element), 25A tubing (inner diameter: 27.2 mm) by Midori Kikai Co., Ltd.

(2) NS Mixer (WB-15A: 24-element), 15A tubing (inner diameter: 16.1 mm) by Tokyo Nisshin Jabara Co., Ltd.

(3) Static mixer (15A: 24-element), inner diameter: 5 mm by Noritake Co., Ltd.

For crosslinking reaction of the polyester resin for toner comprising polyester resin (1) and polyester resin (2), mixing of polyester resin (1) and polyester resin (2) may be carried out simultaneously with the crosslinking reaction, or polyester resin (1) and polyester resin (2) may be mixed first, followed by crosslinking reaction. From the viewpoint of homogeneity of the obtained resin, the preferred method is mixture of polyester resin (1) and polyester resin (2) followed by crosslinking reaction.

For crosslinking reaction of a polyester resin for toner comprising polyester resin (1) and polyester resin (2), it is preferred to add a structural unit derived from 1,4-cyclohexanedimethanol as the constituent component of polyester resin (1), and at least one structural unit selected from among structural units derived from neopentyl glycol, structural units derived from the aforementioned bisphenol A propylene oxide addition products and structural units with unsaturated double bonds, as polyester resin (2).

The amount of radical reaction initiator used is not particularly restricted, but it is preferably 0.1-10 parts by mass to 100 parts by mass as the total of polyester resin (1) and polyester resin (2). A radical reaction initiator used at 0.1 part by mass or greater will tend to promote the crosslinking reaction, while odor will be tolerable at less than 10 parts by mass. The amount used is preferably no greater than 3 parts by mass, more preferably no greater than 1 part by mass and even more preferably no greater than 0.5 part by mass.

The following explanation regards a production process for a polyester resin for toner comprising a THF-soluble fraction and a THF-insoluble fraction, wherein the ratio of the mass-average molecular weight (Mw) and number-average molecular weight (Mn) (Mw/Mn) of the THF-soluble fraction is 6 or greater and the sum of the acid value and hydroxyl value of the THF-insoluble fraction is no greater than 40 mgKOH/g.

First, a production process for a THF-insoluble fraction having an acid value and hydroxyl value sum of no greater than 40 mgKOH/g will be explained. As mentioned above, the THF-insoluble fraction with an acid value and hydroxyl value sum of no greater than 40 mgKOH/g is a component with high-density crosslinking in a high-molecular-weight polyester resin with a high degree of condensation. In order to produce a THF-insoluble fraction with an acid value and hydroxyl value sum of no greater than 40 mgKOH/g, therefore, it is necessary to carry out crosslinking reaction of a high-molecular-weight polyester resin with an acid value and hydroxyl value sum of no greater than 40 mgKOH/g.

The crosslinking method is not particularly restricted and may be crosslinking by reaction of the carboxylic acid or hydroxyl groups, or crosslinking by radical reaction. As examples of crosslinking by reaction of carboxylic acid or hydroxyl groups there may be mentioned reaction of trivalent or greater polyfunctional compounds such as tribasic or greater carboxylic acids, trihydric or greater polyhydric alcohols, trivalent or greater epoxy compounds and trivalent or greater isocyanate compounds. For crosslinking by radical reaction there may be mentioned addition reaction to unsaturated double bonds using radicals, or hydrogen abstraction using radicals.

For crosslinking by reaction of carboxylic acid or hydroxyl groups, it is necessary to react all of the functional groups in the trivalent or greater polyfunctional compound. If a portion of the functional groups of the trivalent or greater polyfunctional compound such as carboxylic acid or hydroxyl groups remain without having reacted, the acid value or hydroxyl value will increase and the sum of the acid value and hydroxyl value for the THF-insoluble fraction will exceed 40 mgKOH/g.

Because it is generally difficult to limit the acid value and hydroxyl value sum of the THF-insoluble fraction to below 40 mgKOH/g by crosslinking using trivalent or greater polyfunctional compounds, the method for limiting the acid value and hydroxyl value sum of the THF-insoluble fraction to no greater than 40 mgKOH/g is preferably addition reaction onto unsaturated double bonds by radicals or hydrogen abstraction by radicals.

As explained above, a THF-insoluble fraction with an acid value and hydroxyl value sum of no greater than 40 mgKOH/g can be obtained by crosslinking reaction of a high-molecular-weight polyester resin with an acid value and hydroxyl value sum of no greater than 40 mgKOH/g, and for example, the method may be crosslinking reaction of polyester resin (1) having a peak molecular weight of 12,000 or greater.

A process for production of a THF-soluble fraction with a mass-average molecular weight (Mw) and number-average molecular weight (Mn) ratio (Mw/Mn) of 6 or greater will now be explained.

As mentioned above, a Mw/Mn ratio for the THF-soluble fraction means that the THF-soluble fraction has a wide molecular weight distribution, and the method for achieving a Mw/Mn ratio of 6 or greater for the THF-soluble fraction may be one of the following two methods.

(a) A method of blending a high-molecular-weight polyester resin that dissolves in THF with a low-molecular-weight polyester resin that dissolves in THF.

(b) A method of crosslinking a polyester resin that dissolves in THF to produce a crosslinked component that dissolves in THF.

Method (b) is preferred among the aforementioned methods to efficiently obtain an I(M100,000)/I(Mp) value in the range of 0.04-0.2.

More specifically, method (b) may be any of the following three methods.

(b-1) A method of low density crosslinking of a high-molecular-weight polyester resin.

(b-2) A method of crosslinking of a low-molecular-weight polyester resin.

(b-3) A method of crosslinking of a high-molecular-weight polyester resin and a low-molecular-weight polyester resin.

For method (b-1), a high-molecular-weight polyester resin may be crosslinked by the method described above, but the crosslink density must be controlled in order to produce a crosslinked component with low crosslink density that dissolves in THF.

For example, when a trivalent or greater polyfunctional compound is used to produce the crosslinked component, a portion of the functional groups may be left without reaction to produce a low-crosslinked component.

When the crosslinked component is produced by radical reaction, the unsaturated double bond content may be controlled to produce a low-crosslinked component. For crosslinking of polyester resin (1), for example, the unsaturated double bond content is preferably no greater than 50 parts by mol to 100 parts by mol of acid components in polyester resin (1) if the constituent component with an unsaturated double bond is a carboxylic acid compound, and it is preferably no greater than 50 parts by mol to 100 parts by mol of acid components in polyester resin (1) if the constituent component with an unsaturated double bond is an alcohol compound. When both are used, their total is preferably no greater than 50 parts by mol. If the unsaturated double bond content of the polyester resin (1) is no greater than 50 parts by mol, production of a crosslinked component that dissolves in THF will be facilitated. The content is more preferably no greater than 45 parts by mol, even more preferably no greater than 40 parts by mol, particularly preferably no greater than 35 parts by mol and most preferably no greater than 30 parts by mol.

For method (b-2), a low-molecular-weight polyester resin may be crosslinked by the method described above, and the crosslinking reaction method is the same as in method (b-1). Since a polyester resin crosslinked by method (b-2) will have a low molecular weight, it will dissolve more readily in THF than a polyester resin crosslinked by method (b-1). When a low-molecular-weight polyester resin is crosslinked by radical reaction, the low-molecular-weight polyester resin preferably contains an unsaturated double bond. For crosslinking reaction of polyester resin (2), for example, it is preferred for polyester resin (2) to contain an unsaturated double bond. The unsaturated bond content of polyester resin (2) is preferably no greater than 1-50 parts by mol to 100 parts by mol of acid components in polyester resin (2) if the constituent component with an unsaturated double bond is a carboxylic acid compound, and it is preferably 1-50 parts by mol to 100 parts by mol of acid components in polyester resin (2) if the constituent component with an unsaturated double bond is an alcohol compound. When both are used, their total is preferably 1-50 parts by mol. The lower limit for the unsaturated double bond content in polyester resin (2) is more preferably 3 parts by mol and most preferably 5 parts by mol. The upper limit for the content is more preferably 40 parts by mol, even more preferably 35 parts by mol and most preferably 25 parts by mol.

Method (b-3) is similar to method (b-1) and method (b-2).

As explained above, a THF-soluble fraction with a Mw/Mn ratio of 6 or greater can be produced by a method such as method (a), method (b-2), method (b-2) or (b-3). For methods (b-1)-(b-3), the Mw/Mn of the THF-soluble fraction can be controlled by controlling the reactivity in the crosslinking reaction. The Mw/Mn ratio of the THF-soluble fraction can be increased by lowering the crosslinking reactivity of the polyester resin (1) for crosslinking reaction of high-molecular-weight polyester resin (1), or by increasing the crosslinking reactivity of polyester resin (2) for crosslinking of polyester resin (2).

Methods for limiting the acid value and hydroxyl value sum of the THF-insoluble fraction to no greater than 40 mgKOH/g and for obtaining a Mw/Mn of 6 or greater for the THF-soluble fraction were explained above, but a particularly preferred method for producing a polyester resin for toner that satisfies both of these conditions is a method of crosslinking a polyester resin for toner comprising polyester resin for toner (1) with a peak molecular weight of 12,000 or greater in gel permeation chromatography and containing an unsaturated double bond, and polyester resin for toner (2) with a peak molecular weight of less than 12,000 in gel permeation chromatography.

In order to ensure that the Mw/Mn ratio of the THF-soluble fraction is at least 6, preferably not only the high-molecular-weight polyester resin (1) but also the low-molecular-weight polyester resin (2) participates in the crosslinking reaction. Also, in order to produce a THF-insoluble fraction with an acid value and hydroxyl value sum of no greater than 40 mgKOH/g, preferably the high-molecular-weight polyester resin (1) is preferentially crosslinked over the low-molecular-weight polyester resin (2).

The contents of the structural units and unsaturated double bonds in polyester resin (1) and polyester resin (2) may be controlled so that both polyester resin (1) and polyester resin (2) participate in the crosslinking reaction with preferential crosslinking of polyester resin (1). For example, polyester resin (1) preferably contains a structural unit derived from 1,4-cyclohexanedimethanol as a constituent component, and the unsaturated double bond content is preferably no greater than 50 parts by mol with respect to 100 parts by mol of the acid components in the polyester resin (1). Also, polyester resin (2) preferably contains an unsaturated double bond, in which case the unsaturated double bond content of polyester resin (2) is preferably no greater than the unsaturated double bond in polyester resin (1).

A toner according to the invention will now be explained.

A toner of the invention is obtained by melt kneading a polyester resin for toner according to any one of (A)-(E) above, a release agent and a coloring agent.

(A) Polyester resin (1) with a peak molecular weight of at least 12,000 in GPC and containing an unsaturated double bond.

(B) A polyester resin for toner obtained by crosslinking reaction of polyester resin (1) with a peak molecular weight of at least 12,000 in GPC and containing an unsaturated double bond.

(C) A polyester resin for toner comprising polyester resin for toner (1) with a peak molecular weight of at least 12,000 in GPC and containing an unsaturated double bond, and polyester resin for toner (2) with a peak molecular weight of less than 12,000 in GPC.

(D) A polyester resin for toner obtained by crosslinking reaction of a polyester resin for toner comprising polyester resin for toner (1) with a peak molecular weight of at least 12,000 in GPC and containing an unsaturated double bond, and polyester resin for toner (2) with a peak molecular weight of less than 12,000 in GPC.

(E) A polyester resin for toner comprising a THF-soluble fraction and a THF-insoluble fraction, wherein the ratio of the mass-average molecular weight/number-average molecular weight (Mw/Mn) of the THF-soluble fraction is 6 or greater and the sum of the acid value and hydroxyl value of the THF-insoluble fraction is no greater than 40 mgKOH/g.

The polyester resin for toner content is not particularly restricted but is preferably 40-60 mass % of the total toner in the case of magnetic toner containing magnetic powder, and preferably 80-95 mass % of the total in the case of non-magnetic toner containing no magnetic powder.

The toner of the invention may also contain a binding resin such as a cyclic olefin resin, epoxy resin, styrene-acrylic resin or the like as desired in addition to the polyester resins (A)-(E).

The release agent is not particularly restricted and may be a release agent with a melting point in the range of 60-130° C., for example. If the melting point of the release agent is 60° C. or higher the blocking resistance of the toner will tend to be more satisfactory, and if it is below 130° C. the low-temperature fixability of the toner will tend to be more satisfactory. The lower limit for the melting point of the release agent is more preferably 65° C., and the upper limit is more preferably 110° C. and most preferably 90° C.

The type of release agent used is not particularly restricted, and there may be mentioned aliphatic hydrocarbon-based waxes such as low-molecular-weight polyethylene, low-molecular-weight polypropylene, microcrystalline wax or paraffin wax; aliphatic hydrocarbon-based wax oxides such as polyethylene oxide wax, or their block compounds; waxes composed mainly of fatty acid esters such as carnauba wax, sasol wax or montanic acid ester wax, and waxes with partial or total deoxidization of the fatty acid esters, such as deoxidized carnauba wax. There may also be mentioned saturated straight-chain fatty acids such as palmitic acid, stearic acid, montanic acid, or long-chain alkylcarboxylic acids with even longer-chain alkyl groups; unsaturated fatty acids such as brandinic acid, eleostearic acid and parinaric acid; saturated alcohols such as stearyl alcohol, aralkyl alcohol, behenyl alcohol, carnaubyl alcohol, ceryl alcohol, melissyl alcohol, or long-chain alkyl alcohols with even longer-chain alkyl groups; polyhydric alcohols such as sorbitol; fatty acid amides such as linolic acid amide, oleic acid amide and lauric acid amide; saturated fatty acid bisamides such as methylenebisstearic acid amide, ethylenebiscapric acid amide, ethylenebislauric acid amide and hexamethylenebisstearic acid amide; unsaturated fatty acid amides such as ethylenebisoleic acid amide, hexamethylenebisoleic acid amide, N,N'-dioleyladipic acid amide and N,N'-dioleylsebacic acid amide; aromatic bisamides such as m-xylenebisstearic acid amide and N,N'-distearylisophthalic acid amide; fatty acid metal salts (also commonly known as "metal soaps") such as calcium stearate, calcium laurate, zinc stearate and magnesium stearate; waxes obtained by grafting vinyl-based monomers such as styrene or acrylic acid onto aliphatic hydrocarbon-based waxes; partial esterified products of fatty acids and polyhydric alcohols such as monoglyceride behenate; and methyl ester compounds with hydroxyl groups obtained by hydrogenation of vegetable fats and oils.

The release agent content is not particularly restricted but is preferably 0.1-10 mass % of the total toner weight. A release agent content of at least 0.1 mass % will tend to produce an adequate release effect even when the amount of coated fixing oil is reduced or it is not used at all, while a content of no greater than 10 mass % will tend to provide satisfactory toner transparency, as well as sufficient chroma and durability during development.

There are no particular restrictions on coloring agents, and any known pigments, dyes and the like may be used. For monochrome toner, for example, there may be mentioned carbon black, nigrosine, sudan black SM, and monoazo, diazo and condensation azo-based dyes or pigments. As examples for color toner there may be mentioned C.I. Solvent Yellow 21, C.I. Solvent Yellow 77, C.I. Solvent Yellow 114, C.I. Pigment Yellow 12, C.I. Pigment Yellow 14, C.I. Pigment Yellow 17, C.I. Pigment Yellow 83, C.I. Solvent Red 19, C.I. Solvent Red 49, C.I. Solvent Red 128, C.I. Pigment Red 5, C.I. Pigment Red 13, C.I. Pigment Red 22, C.I. Pigment Red 48.2, C.I. Disperse Red 11, C.I. Disperse Blue 25, C.I. Disperse Blue 94, C.I. Pigment Blue 60, C.I. Pigment Blue 15.3 and the like. The coloring agents may be used alone or in mixtures of two or more.

The coloring agent content is not particularly restricted, but from the viewpoint of toner color tone and image density, as well as electrostatic stability and thermal characteristics, it is preferably in the range of 0.1-15 mass % of the total toner weight. The lower limit for the coloring agent content is preferably 1 mass % and most preferably 2 mass %. The upper limit for the content is preferably 10 mass % and most preferably 8 mass %.

The toner of the invention contains the aforementioned polyester resin, release agent and coloring agent, but if necessary there may also be added various other additives such as charge controllers, flow modifiers, magnetic materials and the like.

There are no particular restrictions on charge controllers, and as examples there may be mentioned positive charge controllers such as quaternary ammonium salts or basic or electron-donating organic substances, and negative charge controllers such as metal chelates, metallic dyes, and acidic or electron-accepting organic substances. There may further be mentioned metal salts such as chromium, zinc or aluminum salts of salicylic acid or alkylsalicylic acids, metal complexes, amide compounds, phenol compounds, naphthol compounds, calixarene compounds and the like. Styrene-based copolymers, (meth)acrylic polymers and vinyl-based copolymers with sulfonic acid groups may also be mentioned as charge controllers.

The charge controller content is not particularly restricted but is preferably 0.25-5 mass % of the total toner weight. A content of at least 0.25 mass % will tend to yield a toner with an adequate charge level, and a content of no greater than 5 mass % will tend to prevent reduction in charge due to aggregation of the charge controller.

There are no particular restrictions on flow modifiers, and there may be mentioned inorganic fine powders including flow property enhancers such as fine powdered silica, alumina or titania, or magnetite, ferrite, cerium oxide, strontium titanate and conductive titania, resistance regulators such as styrene resins and acrylic resins, lubricants, and the like.

The flow modifier content is not particularly restricted but is preferably 0.05-10 mass % of the total toner weight. A content of at least 0.05 mass % will tend to impart a sufficient flow modifying effect to the toner, while a content of no greater than 10 mass % will tend to result in a toner with more satisfactory durability.

The toner of the invention can be used as a magnetic one-component developer, non-magnetic one-component developer or two-component developer. When it is used as a magnetic one-component developer it will contain a magnetic material, and as examples of magnetic materials there may be mentioned ferromagnetic alloys containing iron, cobalt or nickel, such as ferrite and magnetite, as well as alloys that do not contain ferromagnetic compounds or ferromagnetic elements but exhibit ferromagnetism by appropriate heat treatment, such as "Heusler alloys" comprising manganese and copper, such as manganese-copper-aluminum or manganese-copper-tin, and also chromium dioxide.

The magnetic material content is not particularly restricted, but in the case of a magnetic toner it is preferably 40-60 mass % of the total toner weight. A magnetic material content of at least 40 mass % will tend to produce a toner with a sufficient level of charge, while a content of no greater than 60 mass % will tend to result in a toner with more satisfactory fixability.

When a two-component developer is used, it is preferably used together with a carrier. Any publicly known carriers may be used, including magnetic substances such as iron powder, magnetite powder and ferrite powder, and magnetic carriers obtained by coating resins on the surfaces of such materials. The covering resin for a resin coated carrier may be a commonly known styrene-based resin, acrylic-based resin, styrene-acrylic copolymer-based resin, silicone-based resin, modified silicone-based resin, fluorine-based resin or the like, or a mixture of such resins.

A production process for a toner of the invention will now be explained.

The toner of the invention may be produced by mixing the polyester resin for toner, release agent and coloring agent, with additives such as charge controllers, flow modifiers, magnetic materials or the like as desired, and then melt kneading the mixture with a twin-screw extruder, followed by coarse grinding, fine grinding, classifying and if necessary external addition of a flow modifier.

For the kneading step, the cylinder bore temperature of the extruder is preferably a temperature above the softening temperature of the polyester resin. In this step, the finely ground and classified toner particles may also be subjected to sphericalization treatment.

According to the invention, crosslinking of the polyester resin for toner containing the polyester resin (1) and polyester resin (2) may be accomplished during the toner melt kneading step.

EXAMPLES

The present invention will now be described in greater detail by examples, with the understanding that the invention is not limited to these concrete modes. The methods for evaluating the resins and toners used in the examples were as follows.

(1) Resin Evaluation Methods

1) Softening Temperature

A CFT-500 flow tester (product of Shimadzu Corp.) was used for measurement with a 1 mmϕ×10 mm nozzle using a force of 294N (30 Kgf), a preheating time of 5 minutes and a temperature-elevating rate of 3° C./rain, and the softening temperature was recorded as the temperature at which ½ of a 1.0 g sample exhibited flow.

2) Acid Value

After weighing out approximately 0.2 g of sample in a side-arm Erlenmeyer flask (A (g)), 10 ml of benzyl alcohol was added and the mixture was heated for 15 minutes with a heater at 230° C. under a nitrogen atmosphere to dissolve the resin. After cooling to room temperature, 10 ml of benzyl alcohol, 20 ml of chloroform and a suitable amount of phenolphthalein was added and titration was performed with a 0.02N KOH solution. (Titer=B (ml), KOH solution strength=f). Blank measurement was carried out in the same manner (titer≤C (ml)), and calculation was performed according to the following formula.

$$\text{Acid value (mgKOH/g)}=\{(B-C)\times 0.02\times 56.11\times f\}/A$$

3) Glass Transition Temperature

Using a differential scanning calorimeter (DSC-60 (product of Shimadzu Corp.)), a 10 mg sample was weighed out and placed in an aluminum pan, with an aluminum pan containing alumina as reference, and measurement was performed at a temperature-elevating rate of 5° C./min, after which the temperature at the intersection between the chart baseline and the tangent to the endothermic curve near the glass transition temperature was recorded as the glass transition temperature.

4) Peak Molecular Weight (Mp), Mass-Average Molecular Weight (Mw) and Number-Average Molecular Weight (Mn)

The peak molecular weight (Mp) was determined from the retention time corresponding to the peak value of the obtained elution curve in GPC, based on standard polystyrene. The peak value of the elution curve is the point where the elution curve is at maximum, and where two maximum points exist it is the maximum value of the elution curve. The signal strength of the GPC curve at peak molecular weight (I(Mp)) and the signal strength of the GPC curve at molecular weight 100,000 (I(M100,000)) are, respectively, the difference between the baseline signal strength and the signal strength at peak molecular weight and the difference between baseline signal strength and the signal strength at molecular weight 100,000, and they are represented as potentials (mV).

Apparatus: HLC8020, Toyo Soda Manufacturing Co., Ltd.

Column: TSKgel GMHXL (column size: 7.8 mm (ID)×30.0 cm (L)) by Toyo Soda Manufacturing Co., Ltd., three columns linked in series.

Oven temperature: 40° C.

Eluent: THF

Sample concentration: 4 mg/10 mL

Filtration conditions: Filtration of sample solution with 0.45 μm Teflon™ membrane filter.

Flow rate: 1 mL/min

Injection rate: 0.1 mL

Detector: RI

Standard polystyrene for calibration curve: TSK

Standard A-500 (molecular weight: $5.0\times10^2$), A-2500 (molecular weight: $2.74\times10^3$), F-2 (molecular weight: $1.96\times10^4$), F-20 (molecular weight: $1.9\times10^5$), F-40 (molecular weight: $3.55\times10^5$), F-80 (molecular weight: $7.06\times10^5$), F-128 (molecular weight: $1.09\times10^6$), F-288 (molecular weight: $2.89\times10^6$), F-700 (molecular weight: $6.77\times10^6$), F-2000 (molecular weight: $2.0\times10^7$), by Toyo Soda Manufacturing Co., Ltd.

5) Tetrahydrofuran (THF)-Insoluble Fraction

Approximately 2 g of Celite 545 (Kishida Chemical Co., Ltd.) was placed in a cylindrical glass filter with an inner diameter of 3.5 cm (1GP100, product of Sibata Scientific Technology, Ltd.), and the glass filter was lightly tapped with a cork board until the height of the Celite 545 layer no longer changed. This procedure was repeated 4 times, and the Celite 545 was packed into the glass filter to a Celite 545 layer height of 2 cm from the filter surface. The glass filter packed with the Celite 545 was dried at 105° C. for 3 hours or longer and the weight was measured (Yg). Next, approximately 0.5 g of sample was placed in an Erlenmeyer flask and weighed (Xg), after which 50 ml of THF was added and the mixture was heated for 3 hours in a water bath at 70° C. for dissolution of the sample while circulating THF. The solution was poured into the glass filter packed with the Celite 545 for suction filtration. The glass filter that had captured the THF-insoluble fraction was dried at 80° C. for 3 hours or longer and weighed (Zg), and then the THF-insoluble fraction was calculated by the following formula.

$$\text{THF-insoluble fraction}=(Z-Y)/X\times100\ (\text{mass }\%)$$

6) Acid Value and Hydroxyl Value of Tetrahydrofuran (THF)-Insoluble Fraction

The acid value of the THF-insoluble fraction was determined by the method described under 2) above using the THF-insoluble fraction obtained by the method described under 5) above.

The hydroxyl value of the THF-insoluble fraction was determined by adding 20 mL of an acetylating agent (prepared by adding 500 mL of pyridine to 5 mL of acetic anhydride) to 0.5 g (A(g)) of THF-insoluble fraction obtained by the method described under 5) above, stirring the mixture at 95° C. for 60 minutes and then cooling the solution, further adding 5 mL of distilled water, and using phenolphthalein solution (0.1 mass %) as an indicator in titration with 0.2N aqueous NaOH (titer=B (ml), KOH solution strength=f). Blank measurement was carried out in the same manner (titer=C (ml)), and calculation was performed according to the following formula.

$$\text{Hydroxyl value(mgKOH/g)}=[\{(C-B)\times0.2\times56.11\times f\}/A]+\text{acid value}$$

(2) Toner Evaluation Method

1) Fixability: High-Temperature Offset Resistance

A modified "PAGEPREST N4-612 II" copying machine (Casio Computer Co., Ltd.) was used to output a non-fixed image for a fixing temperature range test. The fixing roller used for the test was a fixing roller without silicone oil coating, set to a nip width of 3 mm and a linear speed of 30 mm/min. A solid image with a 1% printing ratio printed at the top of A4 size paper (BM64T by Daishowa Paperboard Co, Ltd.) was transferred to the roller, with the heating roller preset temperature increased in increments of 5° C. while noting any visible blotches on the lower margin of the paper, and the maximum preset temperature at which no blotches occurred was recorded as the maximum fixing temperature, with scoring on the following scale.

VVG (Very very good): Maximum fixing temperature of 200° C. or higher

VG (Very good): Maximum fixing temperature of at least 190° C. and lower than 200° C.

G (Good): Maximum fixing temperature of at least 180° C. and lower than 190° C.

F (Fair): Maximum fixing temperature of at least 170° C. and lower than 180° C.

P (Poor): Maximum fixing temperature of below 170° C.

2) Fixability: Minimum Fixing Temperature

Copying and fixing were repeated according to the method described above while lowering the heating roller preset temperature in 5° C. increments to 100° C., the fixed image was subjected to a rubbing test, and the temperature at which the fixing ratio exceeded 90% was recorded as the minimum fixing temperature.

The fixing ratio was determined using printing paper for fixing temperature range evaluation, folding the printed section and applying a 5 kg/cm$^2$ load thereto, and then attaching and peeling cellophane tape (N.29, product of Nitto Denko Corp.), measuring the light quantity at the printed section before and after the procedure using a Macbeth illuminometer, and calculating the fixing ratio from the measured values.

$$\text{Fixing ratio(\%)}=(\text{light quantity after cellophane tape peel test/light quantity before test})\times100(\%)$$

VVG: (Very very good): Minimum fixing temperature of no higher than 120° C.

VG: (Very good): Minimum fixing temperature of above 120° C. and no higher than 130° C.

G: (Good): Minimum fixing temperature of above 130° C. and no higher than 140° C.

F: (Fair): Minimum fixing temperature of above 140° C. and no higher than 150° C.

P (Poor): Minimum fixing temperature of above 150° C.

3) Fixability: Fixing Temperature Range

The difference between the maximum fixing temperature and minimum fixing temperature was calculated as the fixing temperature range and scored on the following scale.

VG: (Very good): Fixing temperature range of above 70° C.

G (Good): Fixing temperature range of at least 60° C. and below 70° C.

F (Fair): Fixing temperature range of at least 50° C. and below 60° C.

P (Poor): Fixing temperature range of below 50° C.

4) Toner Storage Stability

The toner was weighed to approximately 5 g and loaded into a sample bottle, and then allowed to stand for about 24 hours in a drier warmed to 45° C., after which the toner aggregation was evaluated as an index of the blocking resistance. The evaluation was based on the following scale.

Good (G): Toner dispersed simply by inverting the sample bottle.

Fair (Fair): Toner dispersed after inverting the sample bottle and tapping it 2-3 times.

P (Poor): Toner dispersed only after inverting the sample bottle and tapping it at least 4-5 times.

5) Durability

A SPEEDIA N5300 (Casio Computer Co., Ltd.) was used as the evaluating device for printing of 5,000 pages under the same conditions as the fixability evaluation method, except that unfixed images with a 2% printing ratio were outputted, after which the presence of contamination on the charged members and any defects in the fixed images were observed.

VG (Very good): Absolutely no contamination of members and no defects in image.

G (Good): Slight contamination of members but no defects in image.

F (Fair): Contamination of members and slight but acceptable defects in image.

P (Poor): Notable contamination of members and considerable defects in image.

Example 1

A monomer component with the charging composition shown in Table 1, 1500 ppm of antimony trioxide with respect to the total acid components and 2000 ppm of a hindered phenol compound (AO-60, Adeka Corp.) with respect to the total acid components were charged into a distillation column-equipped reactor. Temperature elevation was then initiated for heating until the reaction system internal temperature reached 260° C., and this temperature was maintained for continuous esterification reaction until cessation of water run-off from the reaction system. The reaction system internal temperature was then adjusted to 225° C., and the interior of the reactor was brought to reduced pressure for condensation reaction while distilling off the diol component from the reaction system. The viscosity of the reaction system increased as the reaction proceeded, and reaction was conducted until the stirring blade torque reached a value indicating the desired softening temperature. Upon reaching the prescribed torque, the reaction product was removed and cooled to obtain polyester resin (1b). The physical properties of polyester resin (1b) are shown in Table 1.

After premixing 93 parts by mass of the obtained polyester resin (1b), 3 parts by mass of a quinacridone pigment (E02, Clariant Japan), 3 parts by mass of carnauba wax (Toyo Petrolite) and 1 part by mass of a negative electrostatic charge controller (LR-147, Japan Carlit Co., Ltd.), a twin-screw extruder was used for melt kneading at 160° C., and after coarse grinding, a jet mill pulverizer was used for fine grinding and the toner particle sizes were sorted with a classifier to obtain fine powder with a mean particle size of 5 μm. Silica (R-972, Nippon Aerosil Co., Ltd.) was added at 0.2 mass % to the obtained fine powder and the mixture was blended with a Henschel mixer to obtain toner 1. The toner was loaded into a non-magnetic one-component dry copying machine and the performance was evaluated. The evaluation results for toner 1 are shown in Table 4.

Comparative Example 1

Polyester resin (1'j) having no unsaturated double bonds was obtained by the same method as Example 1, except that the charging monomer composition was changed as shown in Table 1 and the condensation step under reduced pressure was carried out at 270° C. The physical properties of polyester resin (1'j) are shown in Table 1.

Toner 2 was obtained by toner formation according to the same method as Example 1, except that polyester resin (1'j) was used instead of polyester resin (1b). The evaluation results for toner 2 are shown in Table 4.

Comparative Example 2

Polyester resin (2i) with a peak molecular weight of 9200 was obtained by the same method as Example 1, except that the charging monomer composition was changed as shown in Table 5. The physical properties of polyester resin (2i) are shown in Table 1.

Toner 3 was obtained by toner formation according to the same method as Example 1, except that polyester resin (2i) was used instead of polyester resin (1b). The evaluation results for toner 3 are shown in Table 4.

Synthesis Example 1

A monomer component with the charging composition shown in Table 1 and 1000 ppm of dibutyltin oxide with respect to the total acid components were charged into a distillation column-equipped reactor. Temperature elevation was then initiated for heating until the reaction system internal temperature reached 265° C., and this temperature was maintained for continuous reaction until cessation of water run-off from the reaction system. The reaction system internal temperature was then adjusted to 220° C., and the interior of the reactor was brought to reduced pressure for continued reaction while distilling off the diol component from the reaction system. The reaction was conducted while repeating the procedure of sampling to measure the softening temperature, until the desired softening temperature was exhibited. Upon reaching the prescribed softening temperature, the reaction product was removed and cooled to obtain polyester resin (2a). The physical properties of polyester resin (2a) are shown in Table 5.

Example 2

Toner 4 was obtained by toner formation according to the same method as Example 1, except that instead of 93 parts by mass of polyester resin (1b) there was used 93 parts by mass of a blended polyester resin obtained by mixing polyester resin (1b) with polyester resin (2a) obtained in Synthesis Example 1 in a proportion of 50/50 (weight ratio). The evaluation results for toner 4 are shown in Table 4.

Comparative Example 3

Toner 5 was obtained by toner formation according to the same method as Example 1, except that instead of 93 parts by mass of polyester resin (1b) there was used 93 parts by mass of a blended polyester resin obtained by mixing polyester resin (1'j) with polyester resin (2a) in a proportion of 50/50 (weight ratio). The evaluation results for toner 5 are shown in Table 4.

Example 3

Polyester resin (1f) was obtained by the same method as Example 1, except that the charging monomer composition was changed as shown in Table 1. The mass-average molecular weight/number-average molecular weight ratio (Mw/Mn) of the polyester resin (1f) was 4.5. The other physical properties are shown in Table 1.

After mixing 0.2 part by mass of benzoyl peroxide (BPO) with 100 parts by mass of the obtained polyester resin (1f), the mixture was supplied to a PCM-30 twin-screw extruder (Ikegai Kogyo Co., Ltd.) for melt kneading and then subjected to crosslinking reaction to obtain polyester resin (3f-1). The crosslinking reaction was carried out in the twin-screw extruder with an external preset temperature of 180° C. and a mean residence time of about 1 minute. The mass-average molecular weight/number-average molecular weight ratio (Mw/Mn) of the THF-soluble fraction of the obtained polyester resin (3f-1) was 7.2. The Mw/Mn changed from 4.5 to 7.2 before and after the crosslinking reaction, thus confirming that THF-soluble crosslinked components had been produced by the crosslinking reaction. The other physical properties are shown in Table 3.

Toner 6 was obtained by toner formation according to the same method as Example 1, except that polyester resin (3f-1) was used instead of polyester resin (1b). The evaluation results for toner 6 are shown in Table 4.

Example 4

Polyester resin (1a) was obtained by the same method as Example 1, except that the charging monomer composition was changed as shown in Table 1. The physical properties of polyester resin are shown in Table 1.

After mixing 40 parts by mass of polyester resin (1a), 60 parts by mass of polyester resin (2a) and 0.2 part by mass of benzoyl peroxide (BPO), the mixture was supplied to a PCM-30 twin-screw extruder (Ikegai Kogyo Co., Ltd.) for melt kneading and then subjected to crosslinking reaction under the same conditions as Example 3 to obtain polyester resin (3a-2). The physical properties of polyester resin (3a-2) are shown in Table 3.

Toner 7 was obtained by toner formation according to the same method as Example 1, except that polyester resin (3a-2) was used instead of polyester resin (1b). The evaluation results for toner 7 are shown in Table 4.

Examples 5-11

Polyester resins (1b)-(1h) were obtained by the same method as Example 1, except that the charging monomer compositions were changed as shown in Table 1. The physical properties of the polyester resins are shown in Table 1.

Polyester resins (3b-2)-(3h-2) were obtained by crosslinking reaction by the same method as Example 4, except that the compositions were as shown in Table 2. The physical properties of the polyester resins are shown in Table 3.

Toners 8-14 were obtained by toner formation according to the same method as Example 1, except that polyester resins (3b-2)-(3h-2) were used instead of polyester resin (1b). The evaluation results for the toners are shown in Table 4.

Example 12

Polyester resin (3b-3) was obtained by crosslinking reaction by the same method as Example 4, except that the composition was as shown in Table 2. The physical properties of polyester resin (3b-3) are shown in Table 3.

Toner 15 was obtained by toner formation according to the same method as Example 1, except that polyester resin (3b-3) was used instead of polyester resin (1b). The evaluation results for toner 15 are shown in Table 4.

Examples 13-14

Polyester resins (2b) and (2c) were obtained by the same method as Synthesis Example 1, except that the charging monomer compositions were changed as shown in Table 5. The physical properties of the polyester resins are shown in Table 5.

Polyester resins (3a-3) and (3c-3) were obtained by crosslinking reaction by the same method as Example 4, except that the compositions were as shown in Table 6. The physical properties of the polyester resins are shown in Table 7.

Toners 16 and 17 were obtained by toner formation according to the same method as Example 1, except that polyester resins (3a-3) and (3c-3) were used instead of polyester resin (1b). The evaluation results for the toners are shown in Table 8.

Example 15

Polyester resin (2d) was obtained by the same method as Example 1, except that the charging monomer composition was changed as shown in Table 5. The physical properties of polyester resin (2d) are shown in Table 5.

Polyester resin (3c-4) was obtained by crosslinking reaction by the same method as Example 4, except that the composition was as shown in Table 6. The physical properties of polyester resin (3c-4) are shown in Table 7.

Toner 18 was obtained by toner formation according to the same method as Example 1, except that polyester resin (3c-4) was used instead of polyester resin (1b). The evaluation results for the toner are shown in Table 8.

Example 16

Polyester resin (3c-5) was obtained by crosslinking reaction by the same method as Example 4, except that the composition was as shown in Table 6. The mass-average molecular weight/number-average molecular weight ratio (Mw/Mn) of the polyester resin before crosslinking reaction (mixture of polyester resin (1c) and polyester resin (2d)) was 4.4, and the mass-average molecular weight/number-average molecular weight ratio (Mw/Mn) of the THF-soluble fraction of polyester resin (3c-5) after crosslinking reaction was 13.6.

The Mw/Mn changed from 4.4 to 13.6 before and after the crosslinking reaction, thus confirming that THF-soluble crosslinked components had been produced by the crosslinking reaction. The physical properties of polyester resin (3c-5) are shown in Table 7.

Toner 19 was obtained by toner formation according to the same method as Example 1, except that polyester resin (3c-5) was used instead of polyester resin (1b). The evaluation results for the toner are shown in Table 8.

Example 17

Polyester resin (3c-6) was obtained by crosslinking reaction by the same method as Example 4, except that the composition was as shown in Table 6. The physical properties of polyester resin (3c-6) are shown in Table 7.

Toner 20 was obtained by toner formation according to the same method as Example 1, except that polyester resin (3c-6) was used instead of polyester resin (1b). The evaluation results for the toner are shown in Table 8.

Examples 18-19

Paraffin wax (SP-160™ by Nippon Seiro Co., Ltd., 1.35 parts by mass) was heated to 70° C. for melting, and then 0.15 part by mass of di-t-butyl peroxide was added and the obtained mixture (paraffin wax/di-t-butyl peroxide=90/10) was cooled and pulverized to prepare crosslinking reaction initiator I.

After mixing 1.5 part by mass of crosslinking reaction initiator I with 100 parts by mass of polyester resin having the composition shown in Table 6, the mixture was supplied to a PCM-30 twin-screw extruder (Ikegai Kogyo Co., Ltd.) for melt kneading and then subjected to crosslinking reaction to obtain polyester resins (3c-7) and (3c-8). The crosslinking reaction was carried out with an external preset temperature of 200° C. and a mean residence time of about 3 minutes. The physical properties of the polyester resins are shown in Table 7.

Toners 21 and 22 were obtained by toner formation according to the same method as Example 1, except that polyester resins (3c-7) and (3c-8) were used instead of polyester resin (1b). The evaluation results for the toners are shown in Table 8.

Examples 20-21

Polyester resin (2e) was obtained by the same method as Synthesis Example 1, except that the charging monomer composition was changed as shown in Table 5. The physical properties of polyester resin (2e) are shown in Table 5.

Polyester resin (1k) was obtained by the same method as Example 1, except that the charging monomer composition was changed as shown in Table 1. The physical properties of polyester resin (1k) are shown in Table 1.

Polyester resins (3k-2) and (3k-3) were obtained by crosslinking reaction by the same method as Example 4, except that the compositions were as shown in Table 6. The physical properties of the polyester resins are shown in Table 7.

Toners 23 and 24 were obtained by toner formation according to the same method as Example 1, except that polyester resins (3k-2) and (3k-3) were used instead of polyester resin (1b). The evaluation results for the toners are shown in Table 8.

Example 22

Polyester resin (2f) was obtained by the same method as Synthesis Example 1, except that the charging monomer composition was changed as shown in Table 5. The physical properties of polyester resin (2f) are shown in Table 5.

Paraffin wax (SP-160™ by Nippon Seiro Co., Ltd., 0.9 part by mass) was heated to 70° C. for melting, and then 0.1 part by mass of 2,5-dimethyl-2,5-bis(t-butylperoxy)hexane was added and the obtained mixture (paraffin wax/2,5-dimethyl-2,5-bis(t-butylperoxy)hexane=90/10) was cooled and pulverized to prepare crosslinking reaction initiator II. Polyester resin (3c-9) was obtained by crosslinking reaction by the same method as Example 18, except that the composition was as shown in Table 6. The mass-average molecular weight/number-average molecular weight ratio (Mw/Mn) of the polyester resin before crosslinking reaction (mixture of polyester resin (1c) and polyester resin (2f)) was 4.4, and the mass-average molecular weight/number-average molecular weight ratio (Mw/Mn) of the THF-soluble fraction of polyester resin (3c-9) after crosslinking reaction was 46.0. The Mw/Mn changed from 4.4 to 46.0 before and after the crosslinking reaction, thus confirming that THF-soluble crosslinked components had been produced by the crosslinking reaction. The physical properties of polyester resin (3c-9) are shown in Table 7.

Toner 25 was obtained by toner formation according to the same method as Example 1, except that polyester resin (3c-9) was used instead of polyester resin (1b). The evaluation results for the toner are shown in Table 8.

Example 23

Polyester resin (2g) was obtained by the same method as Synthesis Example 1, except that the charging monomer composition was changed as shown in Table 5. The physical properties of polyester resin (2g) are shown in Table 5.

Polyester resin (3c-10) was obtained by crosslinking reaction by the same method as Example 18, except that the composition was as shown in Table 6. The physical properties of polyester resin (3c-10) are shown in Table 7.

Toner 26 was obtained by toner formation according to the same method as Example 1, except that polyester resin (3c-10) was used instead of polyester resin (1b). The evaluation results for the toner are shown in Table 8.

Example 24

Polyester resin (1c) and polyester resin (2f) were each heated to 200° C. for melting, and a gear pump was used to supply polyester resin (1c) at a flow rate of 0.45 kg/hr and polyester resin (2f) at a flow rate of 2.55 kg/hr to a blending static mixer (SMX-15A Sulzer Mixer™, 6-element, product of Midori Kikai Co., Ltd.) to a mixing ratio (1c)/(2f)=15/85 (weight ratio), for blending of polyester resin (1c) and polyester resin (2f). The crosslinking reaction initiator II obtained in Example 22 was then introduced into the obtained blended polyester resin at a flow rate of 0.06 kg/hr using a feeder, and crosslinking reaction was conducted while mixing the blended polyester resin and crosslinking reaction initiator with a reaction static mixer (SMX-15A Sulzer Mixer™, 12-element, product of Midori Kikai Co., Ltd.) to obtain polyester resin (3c-11). The physical properties of polyester resin (3c-11) are shown in Table 7.

Toner 27 was obtained by toner formation according to the same method as Example 1, except that polyester resin (3c-11) was used instead of polyester resin (1b). The evaluation results for toner 27 are shown in Table 8.

Comparative Example 4

Polyester resin (21) was obtained by the same method as Synthesis Example 1, except that the charging monomer composition was changed as shown in Table 5. The physical properties of polyester resin (21) are shown in Table 5.

Polyester resin (31-1) was obtained by crosslinking reaction by the same method as Example 3, except that the composition was as shown in Table 6. The physical properties of polyester resin (31-1) are shown in Table 7.

Toner 28 was obtained by toner formation by the same method as Example 1, except that polyester resin (31-1) was used instead of polyester resin (1b). The evaluation results for toner 28 are shown in Table 8.

TABLE 1

| | | Synthesis Example 1a | Synthesis Example 1b | Synthesis Example 1c | Synthesis Example 1d | Synthesis Example 1e | Synthesis Example 1f | Synthesis Example 1 g | Synthesis Example 1 h | Synthesis Example 1'j | Synthesis Example 1k |
|---|---|---|---|---|---|---|---|---|---|---|---|
| Charging composition (parts by mol) | Terephthalic acid | 90 | 80 | 80 | 80 | 80 | 80 | 80 | 80 | 77 | 80 |
| | Isophthalic acid | — | — | — | — | — | — | — | — | 20 | — |
| | Adipic acid | — | — | — | — | — | — | — | — | 3 | — |
| | Fumaric acid | 10 | 20 | 20 | — | 20 | 20 | 20 | 20 | — | 20 |
| | Maleic anhydride | — | — | — | 20 | — | — | — | — | — | — |
| | Ethylene glycol | 80 | 80 | 80 | 100 | 80 | 80 | 80 | 80 | 105 | 120 |

TABLE 1-continued

| | | Synthesis Example 1a | Synthesis Example 1b | Synthesis Example 1c | Synthesis Example 1d | Synthesis Example 1e | Synthesis Example 1f | Synthesis Example 1 g | Synthesis Example 1 h | Synthesis Example 1'j | Synthesis Example 1k |
|---|---|---|---|---|---|---|---|---|---|---|---|
| | 1,4-cyclohexane-dimethanol | 40 | 40 | 40 | 20 | 40 | 40 | 40 | 40 | 15 | — |
| Resin composition (parts by mol) | Terephthalic acid | 92.3 | 84.3 | 84.3 | 84.5 | 84.1 | 84.0 | 84.0 | 83.8 | 77.3 | 84.0 |
| | Isophthalic acid | — | — | — | — | — | — | — | — | 19.8 | — |
| | Adipic acid | — | — | — | — | — | — | — | — | 2.9 | — |
| | Fumaric acid | 7.7 | 15.7 | 15.7 | — | 15.9 | 16.0 | 16.0 | 16.2 | — | 16.0 |
| | Maleic anhydride | — | — | — | 15.5 | — | — | — | — | — | — |
| | Ethylene glycol | 62.3 | 62.3 | 62.6 | 76.2 | 62.5 | 63.9 | 65.7 | 67.5 | 83.8 | 98.8 |
| | 1,4-Cyclohexane-dimethanol | 35.6 | 35.7 | 35.7 | 19.5 | 35.1 | 35.1 | 35.1 | 35.6 | 15.5 | — |
| | SP value $(cal/cm^3)^{1/2}$ | 11.6 | 11.6 | 11.6 | 11.6 | 11.6 | 11.6 | 11.6 | 11.6 | 12.1 | 12.3 |
| Physical properties | Tg (° C.) | 70.6 | 63.1 | 60.8 | 60.5 | 61.6 | 57.8 | 58.2 | 55.2 | 59.6 | 53.2 |
| | Softening temperature (° C.) | 176 | 171 | 163 | 157 | 146 | 140 | 137 | 126 | 161 | 170 |
| | Acid value (mgKOH/g) | 2.6 | 2.3 | 2.5 | 2.7 | 3 | 2.3 | 4.1 | 4.5 | 2.1 | 2.6 |
| | Hydroxyl value (mgKOH/g) | 8.5 | 8.4 | 11.1 | 11.2 | 13.3 | 15.7 | 16.2 | 18.0 | 9.3 | 5.8 |
| | Mass-average parts by mol. wt. (Mw) | 46170 | 58300 | 38840 | 70250 | 29140 | 25090 | 23770 | 16230 | 32370 | 75360 |
| | Num.-average parts by mol. wt. (Mn) | 10100 | 11510 | 7190 | 13720 | 6890 | 5610 | 5530 | 4970 | 9850 | 13310 |
| | Mw/Mn | 4.6 | 5.1 | 5.4 | 5.1 | 4.2 | 4.5 | 4.2 | 3.3 | 3.3 | 5.7 |
| | Peak parts by mol. wt. (Mp) | 29,000 | 22900 | 20310 | 17600 | 17730 | 16360 | 14670 | 12290 | 30,000 | 14040 |

TABLE 2

| | Polyester resin 1 | | | Polyester resin 2 | | | Difference in SP | Polymerization initiator | |
|---|---|---|---|---|---|---|---|---|---|
| | No. | Peak parts by mol. wt. | Content (parts by mass) | No. | Peak parts by mol. wt. | Content (parts by mass) | values of resin 1 and resin 2 | Type | Content (parts by mass) |
| Resin 3a-2 | 1a | 29,000 | 40 | 2a | 5000 | 60 | 0.2 | BPO | 0.2 |
| Resin 3b-2 | 1b | 22900 | 40 | 2a | 5000 | 60 | 0.2 | BPO | 0.2 |
| Resin 3c-2 | 1c | 20310 | 40 | 2a | 5000 | 60 | 0.2 | BPO | 0.2 |
| Resin 3d-2 | 1d | 17600 | 40 | 2a | 5000 | 60 | 0.2 | BPO | 0.4 |
| Resin 3e-2 | 1e | 17730 | 40 | 2a | 5000 | 60 | 0.2 | BPO | 0.4 |

TABLE 2-continued

| | Polyester resin 1 | | | Polyester resin 2 | | | Difference in SP | Polymerization initiator | |
|---|---|---|---|---|---|---|---|---|---|
| | No. | Peak parts by mol. wt. | Content (parts by mass) | No. | Peak parts by mol. wt. | Content (parts by mass) | values of resin 1 and resin 2 | Type | Content (parts by mass) |
| Resin 3f-1 | 1f | 16360 | 100 | — | — | — | — | BPO | 0.2 |
| Resin 3f-2 | 1f | 16360 | 40 | 2a | 5000 | 60 | 0.2 | BPO | 0.4 |
| Resin 3g-2 | 1g | 14670 | 40 | 2a | 5000 | 60 | 0.2 | BPO | 0.4 |
| Resin 3h-2 | 1h | 12290 | 40 | 2a | 5000 | 60 | 0.2 | BPO | 0.4 |
| Resin 3b-3 | 1b | 22900 | 30 | 2a | 5000 | 70 | 0.2 | BPO | 0.4 |

*BPO: Benzoyl peroxide

TABLE 3

| | Total resin properties | | | | THF-soluble fraction properties | | | | THF-insoluble fraction | | |
|---|---|---|---|---|---|---|---|---|---|---|---|
| | Tg (° C.) | Softening temperature (° C.) | Acid value (mgKOH/g) | THF-insoluble fraction (mass %) | Mw/Mn | Peak parts by mol. wt. (Mp) | GPC signal strength at peak parts by mol. wt. $I(M_p)$ (mV) | GPC signal strength at parts by mol. wt. 100,000 $I(M_{100,000})$ (mV) | $I(M_{100,000})/I(M_p)$ | Acid value (mgKOH/g) | Hydroxyl value (mgKOH/g) | Sum of acid value and hydroxyl value (mgKOH/g) |
| Resin 3a-2 | 57.4 | 137 | 11.6 | 12.3 | 7.4 | 5040 | 158.3 | 12.8 | 0.08 | 0.4 | 10.7 | 11.1 |
| Resin 3b-2 | 55.5 | 134 | 11.5 | 17.6 | 8.0 | 4980 | 156.2 | 11.5 | 0.07 | 0.5 | 11.5 | 12.0 |
| Resin 3c-2 | 55.4 | 133 | 11.6 | 17 | 6.5 | 5030 | 162.2 | 11.4 | 0.07 | 0.5 | 11.6 | 12.1 |

TABLE 3-continued

| | Total resin properties | | | | THF-soluble fraction properties | | | | | THF-insoluble fraction | | |
|---|---|---|---|---|---|---|---|---|---|---|---|---|
| | Tg (° C.) | Softening temperature (° C.) | Acid value (mgKOH/g) | THF-insoluble fraction (mass %) | Mw/Mn | Peak parts by mol. wt. (Mp) | GPC signal strength at peak parts by mol. wt. I ($M_p$) (mV) | GPC signal strength at parts by mol. wt. 100,000 I ($M_{100,000}$) (mV) | I ($M_{100,000}$)/I ($M_p$) | Acid value (mgKOH/g) | Hydroxyl value (mgKOH/g) | Sum of acid value and hydroxyl value (mgKOH/g) |
| Resin 3d-2 | 55.3 | 135 | 11.6 | 20.3 | 6.8 | 5020 | 150.5 | 10.5 | 0.07 | 0.8 | 12.0 | 12.8 |
| Resin 3e-2 | 55.7 | 134 | 11.8 | 20 | 7.0 | 5020 | 160.2 | 11.2 | 0.07 | 0.8 | 13.9 | 14.7 |
| Resin 3f-1 | 58.8 | 147 | 2.1 | 25.1 | 7.2 | 9850 | 136.8 | 13.4 | 0.1 | 0.8 | 15.3 | 16.1 |
| Resin 3f-2 | 54.2 | 130 | 11.5 | 19.5 | 6.4 | 5050 | 161.2 | 12.7 | 0.08 | 0.9 | 16.9 | 17.8 |
| Resin 3g-2 | 53.3 | 127 | 12.2 | 19 | 6.9 | 5000 | 158.4 | 12.8 | 0.08 | 1.0 | 18.5 | 19.5 |
| Resin 3h-2 | 55.2 | 125 | 12.4 | 15.4 | 6.2 | 4960 | 164.4 | 13.2 | 0.08 | 1.1 | 19.9 | 21.0 |
| Resin 3b-3 | 54.4 | 131 | 13.1 | 19.8 | 6.5 | 5040 | 112.4 | 11.8 | 0.1 | 0.5 | 11.6 | 12.1 |

TABLE 4

| | No. | Polyester resin | Difference in SP value of resin 1 and resin 2 | Minimum fixing temperature (° C.) | Low-temperature fixability | Maximum fixing temperature (° C.) | High-temperature offset resistance | Fixing temperature range (° C.) | Fixing range | Durability | Storage stability |
|---|---|---|---|---|---|---|---|---|---|---|---|
| Example 1 | Toner 1 | Resin 1b | — | 140 | G | 190 | VG | 50 | F | F | VG |
| Comparative Example 1 | Toner 2 | Resin 1'j | — | 135 | G | 175 | F | 40 | P | F | VG |
| Comparative Example 2 | Toner 3 | Resin 2i | — | 130 | VG | 160 | P | 30 | P | P | VG |
| Example 2 | Toner 4 | Resin 1b/ Resin 2a | 0.2 | 130 | VG | 180 | G | 50 | F | F | VG |
| Comparative Example 3 | Toner 5 | Resin 1'j/ Resin 2a | 0.7 | 130 | VG | 170 | F | 40 | P | F | F |
| Example 3 | Toner 6 | Resin 3f-1 | 0.2 | 145 | F | 200 | VVG | 55 | F | G | VG |
| Example 4 | Toner 7 | Resin 3a-2 | 0.2 | 125 | VG | 200 | VVG | 75 | VG | G | VG |
| Example 5 | Toner 8 | Resin 3b-2 | 0.2 | 120 | VVG | 200 | VVG | 80 | VG | G | VG |
| Example 6 | Toner 9 | Resin 3c-2 | 0.2 | 120 | VVG | 195 | VG | 75 | VG | G | VG |
| Example 7 | Toner 10 | Resin 3d-2 | 0.2 | 120 | VVG | 190 | VG | 70 | VG | G | VG |
| Example 8 | Toner 11 | Resin 3e-2 | 0.2 | 120 | VVG | 190 | VG | 70 | VG | G | VG |
| Example 9 | Toner 12 | Resin 3f-2 | 0.2 | 120 | VVG | 190 | VG | 70 | VG | G | VG |
| Example 10 | Toner 13 | Resin 3g-2 | 0.2 | 120 | VVG | 180 | G | 60 | G | G | VG |
| Example 11 | Toner 14 | Resin 3h-2 | 0.2 | 120 | VVG | 180 | G | 60 | G | G | VG |
| Example 12 | Toner 15 | Resin 3b-3 | 0.2 | 115 | VVG | 185 | G | 70 | VG | G | VG |

TABLE 5

| | | Synth. Ex. 2a | Synth. Ex. 2b | Synth. Ex. 2c | Synth. Ex. 2d | Synth. Ex. 2e | Synth. Ex. 2f | Synth. Ex. 2 g | Synth. Ex. 2i | Synth. Ex. 2l |
|---|---|---|---|---|---|---|---|---|---|---|
| Charging composition | Terephthalic acid (parts by mol) | 80 | 80 | 80 | 80 | 80 | 90 | 90 | 80 | — |
| | Isophthalic acid (parts by mol) | 20 | 20 | 20 | — | 20 | — | — | — | — |
| | Fumaric acid (parts by mol) | — | — | — | 20 | — | 10 | 10 | 20 | 100 |
| | Ethylene glycol (parts by mol) | 25 | 25 | 39 | 45 | 60 | 45 | 55 | 80 | — |
| | 1,10-Decanediol (parts by mol) | — | — | 6 | — | — | — | — | — | — |
| | Neopentyl glycol (parts by mol) | 80 | 80 | 60 | 60 | — | 60 | — | — | — |
| | 1,4-Cyclohexanedimethanol (parts by mol) | — | — | — | — | — | — | — | 40 | — |
| | Polyoxyethylene-(2.0)-2,2-bis (4-hydroxyphenyl) propane (parts by mol) | — | — | — | — | 30 | — | 40 | — | — |
| | Polyoxypropylene-(2.2)-2,2-bis(4-hydroxyphenyl)propane (parts by mol) | — | — | — | — | — | — | — | — | 100 |

TABLE 5-continued

| | | Synth. Ex. 2a | Synth. Ex. 2b | Synth. Ex. 2c | Synth. Ex. 2d | Synth. Ex. 2e | Synth. Ex. 2f | Synth. Ex. 2 g | Synth. Ex. 2i | Synth. Ex. 2l |
|---|---|---|---|---|---|---|---|---|---|---|
| | Uniline 700 (mass %) | — | 3 | 5 | — | — | 1 | — | — | — |
| | Wax A (mass %) | — | — | — | — | — | — | 2 | — | — |
| Resin composition | Terephthalic acid (parts by mol) | 80.0 | 80.2 | 80.0 | 82.8 | 79.8 | 91.7 | 91.6 | 83.7 | — |
| | Isophthalic acid (parts by mol) | 20.0 | 19.8 | 20.0 | — | 20.2 | — | — | — | — |
| | Fumaric acid (parts by mol) | — | — | — | 17.2 | — | 8.3 | 8.4 | 16.3 | 100.0 |
| | Ethylene glycol (parts by mol) | 22.2 | 23.0 | 37.4 | 40.1 | 59.5 | 39.0 | 54.4 | 69.4 | -— |
| | 1,10-Decanediol (parts by mol) | — | — | 6.1 | — | — | — | — | — | — |
| | Neopentyl glycol (parts by mol) | 80.3 | 80.3 | 60.2 | 62.2 | — | 59.8 | — | — | — |
| | 1,4-Cyclohexanedimethanol (parts by mol) | — | — | — | — | — | — | — | 35.5 | — |
| | Polyoxyethylene-(2.0)-2,2-bis (4-hydroxyphenyl)propane (parts by mol) | — | — | — | — | 30.2 | — | 40.2 | — | — |
| | Polyoxypropylene-(2.2)-2,2-bis(4-hydroxyphenyl) propane (parts by mol) | — | — | — | — | — | — | — | — | 103.2 |
| | Uniline 700 (mass %) | — | 2.9 | 4.8 | — | — | 1 | — | — | — |
| | Wax A (mass %) | — | — | — | — | — | — | 1.9 | — | — |
| | SP value $(cal/cm^3)^{1/2}$ | 11.4 | 11.2 | 11.3 | 11.5 | 12 | 11.5 | 11.7 | 11.6 | 10.7 |
| Physical properties | Tg (° C.) | 51.8 | 49.8 | 47.9 | 47.6 | 60.2 | 48 | 61.8 | 51.6 | 52.4 |
| | Softening temperature (° C.) | 104 | 104 | 107 | 103 | 107 | 103 | 112 | 118 | 99 |
| | Acid value (mgKOH/g) | 17.6 | 13.6 | 7.7 | 14.5 | 36.1 | 17.8 | 21.6 | 4.2 | 9.5 |
| | Hydroxyl value (mgKOH/g) | 34.7 | 37.3 | 28.0 | 20.2 | 11.8 | 23.4 | 10.7 | 36.2 | 35.9 |
| | Mass-average parts by mol. wt. (Mw) | 5700 | 5540 | 9210 | 9690 | 6240 | 7090 | 10890 | 11030 | 13480 |
| | Num.-average parts by mol. wt. (Mn) | 2370 | 2200 | 3650 | 3770 | 2340 | 2720 | 4110 | 3180 | 4590 |
| | Mw/Mn | 2.4 | 2.5 | 2.5 | 2.6 | 2.7 | 2.6 | 2.7 | 3.5 | 2.9 |
| | Peak parts by mol. wt. (Mp) | 5000 | 5000 | 8500 | 7340 | 5800 | 5570 | 9360 | 9200 | 7820 |

*Wax A: PP (Mn = 1000) base, maleic acid-modified at one end

TABLE 6

| | Polyester resin 1 | | | Polyester resin 2 | | | Difference in | Polymerization initiator | |
|---|---|---|---|---|---|---|---|---|---|
| | No. | Peak parts by mol. wt. | Content (parts by mass) | No. | Peak parts by mol. wt. | Content (parts by mass) | SP values of resin 1 and resin 2 | Type | Content (parts by mass) |
| Resin3a-3 | 1a | 29,000 | 30 | 2c | 8500 | 70 | 0.3 | BPO | 0.6 |
| Resin3c-3 | 1c | 20310 | 30 | 2b | 5000 | 70 | 0.4 | BPO | 0.4 |
| Resin3c-4 | 1c | 20310 | 30 | 2d | 7340 | 70 | 0.1 | BPO | 0.4 |
| Resin3c-5 | 1c | 20310 | 15 | 2d | 7340 | 85 | 0.1 | BPO | 0.4 |
| Resin3c-6 | 1c | 20310 | 5 | 2d | 7340 | 95 | 0.1 | BPO | 0.4 |
| Resin3c-7 | 1c | 20310 | 30 | 2a | 5000 | 70 | 0.2 | I | 1.5 |
| Resin3c-8 | 1c | 20310 | 20 | 2a | 5000 | 80 | 0.2 | I | 1.5 |
| Resin3k-2 | 1k | 14040 | 40 | 2e | 5800 | 60 | 0.3 | BPO | 0.4 |
| Resin3k-3 | 1k | 14040 | 40 | 2a | 5000 | 60 | 0.9 | BPO | 0.4 |
| Resin 3c-9 | 1c | 20310 | 15 | 2f | 5570 | 85 | 0.1 | II | 0.75 |
| Resin 3c-10 | 1c | 20310 | 15 | 2 g | 9360 | 85 | 0.1 | II | 2.0 |
| Resin 3c-11 | 1c | 20310 | 15 | 2f | 5570 | 85 | 0.1 | II | 1.6 |
| Resin 31-1 | — | — | — | 2l | 7820 | 100 | — | BPO | 0.8 |

*I: SP-160/di-t-Butyl peroxide = 90/10 (mass) mixture

*II: SP-160/2,5-Dimethyl-2,5-bis(t-butylperoxy)hexane = 90/10 (mass) mixture

TABLE 7

| | Total resin properties | | | | THF-soluble fraction properties | | | | | THF-insoluble fraction properties | | |
|---|---|---|---|---|---|---|---|---|---|---|---|---|
| | Tg (° C.) | Softening temperature (° C.) | Acid value (mgKOH/g) | THF-insoluble fraction (mass %) | Mw/Mn | Peak parts by mol. wt. (Mp) | GPC signal strength at peak parts by mol. wt. I ($M_p$) (mV) | GPC signal strength at parts by mol. wt. 100,000 I ($M_{100,000}$) (mV) | I ($M_{100,000}$)/I ($M_p$) | Acid value (mgKOH/g) | Hydroxyl value (mgKOH/g) | Sum of acid value and hydroxyl value (mgKOH/g) |
| Resin3a-3 | 49.4 | 133 | 6.1 | 14.6 | 6.3 | 8400 | 137.8 | 12.5 | 0.09 | 0.4 | 10.6 | 11.0 |
| Resin3c-3 | 47.5 | 124 | 10.4 | 18.6 | 6.3 | 4950 | 121.4 | 12.2 | 0.1 | 0.5 | 11.6 | 12.1 |
| Resin3c-4 | 53.6 | 147 | 10.9 | 25.1 | 7.2 | 7840 | 163.2 | 8.4 | 0.05 | 0.5 | 11.5 | 12.0 |
| Resin3c-5 | 51.9 | 136 | 12.7 | 21.3 | 13.6 | 7000 | 128.8 | 11.0 | 0.09 | 6.2 | 28.9 | 35.1 |
| Resin3c-6 | 52.1 | 126 | 13.9 | 14.3 | 50.5 | 6700 | 118.5 | 10.3 | 0.09 | 6 | 30.7 | 36.7 |
| Resin3c-7 | 53.3 | 127 | 13.1 | 23.8 | 6.2 | 7980 | 121.4 | 12.2 | 0.1 | 0.5 | 11.4 | 11.9 |
| Resin3c-8 | 52.6 | 119 | 14.5 | 13.5 | 6.4 | 5050 | 141.6 | 12.4 | 0.09 | 0.5 | 11.5 | 11.9 |
| Resin3k-2 | 57.3 | 133 | 31 | 20.9 | 6.1 | 5890 | 130.6 | 11.8 | 0.09 | 0.7 | 13.2 | 13.9 |
| Resin3k-3 | 51.7 | 131 | 11.6 | 18.5 | 6.3 | 5050 | 149.5 | 11.2 | 0.07 | 0.7 | 13.3 | 14.0 |
| Resin3c-9 | 54.5 | 134 | 15.5 | 19.4 | 46 | 5170 | 141.7 | 8.2 | 0.06 | 6.4 | 25.5 | 31.9 |
| Resin3c-10 | 60.2 | 140 | 23.1 | 19.3 | 318.9 | 9050 | 121.7 | 9.8 | 0.08 | 4.4 | 20.8 | 25.2 |
| Resin3c-11 | 54.9 | 132 | 15.4 | 14.1 | 52.1 | 5250 | 135.7 | 9.4 | 0.07 | 6.2 | 24.7 | 30.9 |
| Resin31-1 | 53.2 | 134 | 8.8 | 32.7 | 3.2 | 7760 | 169.5 | 5.6 | 0.03 | 6.8 | 41.1 | 47.9 |

TABLE 8

| | No. | Polyester resin | Minimum fixing temperature (° C.) | Low-temperature fixability | Maximum fixing temperature (° C.) | High-temperature offset resistance | Fixing temperature range (° C.) | Fixing range | Durability | Storage stability |
|---|---|---|---|---|---|---|---|---|---|---|
| Example 13 | Toner 16 | Resin 3a-3 | 110 | VVG | 200 | VVG | 90 | VG | G | VG |
| Example 14 | Toner 17 | Resin 3c-3 | 110 | VVG | 190 | VG | 90 | VG | G | VG |
| Example 15 | Toner 18 | Resin 3c-4 | 120 | VVG | 200 | VVG | 80 | VG | G | VG |
| Example 16 | Toner 19 | Resin 3c-5 | 110 | VVG | 200 | VVG | 90 | VG | VG | VG |
| Example 17 | Toner 20 | Resin 3c-6 | 105 | VVG | 195 | VG | 90 | VG | VG | VG |
| Example 18 | Toner 21 | Resin 3c-7 | 115 | VVG | 175 | F | 60 | G | G | VG |
| Example 19 | Toner 22 | Resin 3c-8 | 110 | VVG | 175 | F | 65 | G | G | VG |
| Example 20 | Toner 23 | Resin 3k-2 | 125 | VG | 190 | VG | 65 | G | G | VG |
| Example 21 | Toner 24 | Resin 3k-3 | 120 | VVG | 180 | G | 60 | G | G | F |
| Example 22 | Toner 25 | Resin 3c-9 | 105 | VVG | 200 | VVG | 95 | VG | VG | VG |
| Example 23 | Toner 26 | Resin 3c-10 | 115 | VVG | 200 | VVG | 85 | VG | VG | VG |
| Example 24 | Toner 27 | Resin 3c-11 | 105 | VVG | 200 | VVG | 95 | VG | VG | VG |
| Comparative Example 4 | Toner 28 | Resin 31-1 | 135 | G | 180 | G | 45 | P | P | VG |

As seen by the results of Examples 1-24, the toners containing polyester resin (1) having a peak molecular weight of 12,000 or greater in GPC and containing unsaturated double bonds exhibited a satisfactory balance between low-temperature fixability and high-temperature offset resistance, and therefore had a wide fixing temperature range of 50° C. or greater, while also exhibiting a practical level of storage stability and durability.

Toner 2 (Comparative Example 1) had a peak molecular weight of 30,000, but since it comprised polyester resin (1'j) with no unsaturated double bonds, the minimum fixing temperature was satisfactory at 135° C. but the maximum fixing temperature was 175° C., and therefore the fixing range was narrow at only 40° C.

Toner 3 (Comparative Example 2) contained unsaturated double bonds, but since it comprised polyester resin (2i) with a peak molecular weight of less than 12,000, the minimum fixing temperature was satisfactory at 130° C. but the maximum fixing temperature was unacceptable at 160° C. while the fixing range was narrow at only 35° C.

Toner 5 (Comparative Example 3) had a peak molecular weight of 30,000, but since it comprised polyester resin (1'j) with no unsaturated double bonds and polyester resin (2a) with a peak molecular weight of less than 12,000, the minimum fixing temperature was satisfactory at 130° C. but the maximum fixing temperature was the minimum acceptable level of 170° C. while the fixing range was narrow at only 40° C.

Toner 28 (Comparative Example 4) had unsaturated double bonds, but since it comprised polyester resin (31-1) obtained by crosslinking polyester resin (21) with a peak molecular weight of less than 12,000, the minimum fixing temperature was satisfactory at 135° C. and the maximum fixing temperature was satisfactory at 180° C., but the fixing range was unacceptably narrow at only 45° C. Also, since the Mw/Mn of the THF-soluble fraction was 3.2 and the sum of the acid value and hydroxyl value of the THF-insoluble fraction was 40 mgKOH/g, the durability was significantly impaired.

The invention claimed is:

1. A process for production of a polyester resin for toner comprising blending and crosslinking amorphous polyester resin for toner (1) with a peak molecular weight of at least 12,000 in gel permeation chromatography and containing an unsaturated double bond, and amorphous polyester resin for toner (2) with a peak molecular weight of less than 12,000 in gel permeation chromatography, with the use of a radical reaction initiator.

2. The process according to claim 1, wherein an upper limit for the peak molecular weight of amorphous polyester resin (2) is 11,000.

3. The process according to claim 1, wherein an upper limit for the peak molecular weight of amorphous polyester resin (2) is 10,000.

4. The process according to claim 1, wherein a lower limit for the peak molecular weight of amorphous polyester resin (2) is 2,000.

5. The process according to claim 1, wherein Mw of amorphous polyester resin (2) is no greater than 12,000.

6. The process according to claim 1, wherein a lower limit for the Mw of amorphous polyester resin (2) is 4,000.

7. The process according to claim 1, wherein Mn of amorphous polyester resin (2) is no greater than 4,500.

8. The process according to claim 1, wherein a lower limit for the Mn of amorphous polyester resin (2) is 1,000.

9. The process according to claim 1, wherein a softening temperature of amorphous polyester resin (2) is 80-130° C.

10. The process according to claim 1, wherein Tg of amorphous polyester resin (2) is 40-70° C.

11. The process according to claim 1, wherein an acid value of amorphous polyester resin (2) is no greater than 50 mgKOH/g.

12. The process according to claim 1, wherein amorphous polyester resin (2) comprises a constituent component derived from a $C_{30}$ or greater monovalent carboxylic acid compound and/or $C_{30}$ or greater monohydric alcohol compound.

13. The process according to claim 1, wherein a difference in softening temperature between amorphous polyester resin (1) and amorphous polyester resin (2) is at least 20° C.

14. The process according to claim 1, wherein said resin comprise a THF-insoluble fraction comprising a crosslinked fraction that is insoluble in THF and a THF-soluble fraction comprising a crosslinked fraction that is soluble in THF, unreacted amorphous polyester resin (1) and unreacted amorphous polyester resin (2).

15. The process according to claim 1, wherein amorphous polyester resin (2) contains at least one unsaturated double bond.

* * * * *